(12) United States Patent
Camiel

(10) Patent No.: US 10,460,117 B2
(45) Date of Patent: Oct. 29, 2019

(54) SYSTEM AND METHOD FOR REMOVING INTERNET ATTACK SURFACE FROM INTERNET CONNECTED DEVICES

(71) Applicant: Noam Camiel, Tel Aviv (IL)

(72) Inventor: Noam Camiel, Tel Aviv (IL)

( * ) Notice: Subject to any disclaimer, the term of this patent is extended or adjusted under 35 U.S.C. 154(b) by 179 days.

(21) Appl. No.: 15/376,641

(22) Filed: Dec. 12, 2016

(65) Prior Publication Data

US 2017/0169234 A1    Jun. 15, 2017

Related U.S. Application Data

(60) Provisional application No. 62/266,696, filed on Dec. 13, 2015.

(51) Int. Cl.
| | |
|---|---|
| *G06F 21/60* | (2013.01) |
| *G06F 21/62* | (2013.01) |
| *G06F 21/45* | (2013.01) |
| *H04L 29/08* | (2006.01) |
| *H04W 4/70* | (2018.01) |

(52) U.S. Cl.
CPC ............ *G06F 21/606* (2013.01); *H04L 67/12* (2013.01); *H04W 4/70* (2018.02)

(58) Field of Classification Search
CPC ....... G06F 21/606; H04W 4/70; H04W 4/005; H04W 52/00; H04L 63/029; H04L 63/06; H04L 67/12; H02J 3/00
See application file for complete search history.

(56) References Cited

U.S. PATENT DOCUMENTS

| | | | |
|---|---|---|---|
| 8,839,426 B1* | 9/2014 | Brueckner | G06F 11/1469 726/22 |
| 9,832,220 B2* | 11/2017 | Kwiat | H04L 63/1441 |
| 10,032,361 B2* | 7/2018 | Chadwick | G08B 27/00 |
| 2006/0010500 A1* | 1/2006 | Elazar | G06F 21/10 726/27 |

(Continued)

OTHER PUBLICATIONS

NPL, Skkynet, "Security Connect, Network, Access and Visualize Your Data", 15 pages. (Year: 2015).*

*Primary Examiner* — Yonas A Bayou

(57) ABSTRACT

A system and method is introduced for communicating over the internet with no internet attack surface using internet connected devices. An isolated device referred to as a dc device, is introduced to function as a place for carrying out computations in isolation from internet connected devices as well as from other instances within the dc device. A user is able to interact with the dc device through a dc terminal. The dc terminal may make use of the input/output interfaces of the user internet connected device, while maintaining the isolation of the dc device. A dc server is introduced for communicating with the dc device over the internet with no internet attack surface. Having introduced the dc device, the dc terminal and the dc server, a dc domain is defined where communication between devices and between users and devices takes place in the dc domain over the internet with no internet attack surface. Uses for the dc domain may be user authentication, messaging between users, payment applications, cloud applications, IoT, smart vehicles, medical applications, document uses and so forth. In the dc domain content and ad serving may take place between a dc server and a dc device.

50 Claims, 22 Drawing Sheets

(56) References Cited

U.S. PATENT DOCUMENTS

| | | | |
|---|---|---|---|
| 2012/0110649 A1* | 5/2012 | Murphy | G06F 21/34 726/4 |
| 2014/0007250 A1* | 1/2014 | Stefanov | G06F 21/60 726/26 |
| 2014/0066089 A1* | 3/2014 | Monks | G01S 5/02 455/456.1 |
| 2014/0134971 A1* | 5/2014 | Monks | G01S 5/02 455/404.2 |
| 2014/0157405 A1* | 6/2014 | Joll | H04L 63/1425 726/22 |
| 2014/0344937 A1* | 11/2014 | Sabin | H04L 63/1433 726/25 |
| 2016/0072770 A1* | 3/2016 | Crane | H04L 63/0281 726/22 |
| 2016/0110548 A1* | 4/2016 | Murthy | G06F 16/9535 726/25 |
| 2016/0197901 A1* | 7/2016 | Lester | H04L 63/065 380/283 |

* cited by examiner

SYSTEM AND METHOD FOR REMOVING INTERNET ATTACK SURFACE FROM INTERNET CONNECTED DEVICES

CROSS-REFERENCE TO RELATED APPLICATIONS

This application claims the benefit of U.S. Provisional Patent Ser. No. 62/266,696, filed Dec. 13, 2015 by the present inventor.

U.S. patent application Ser. Nos. 14/231,482 and 14/231,500 by the present inventor are referred to in this application and herein incorporated in their entirety by reference into the specification.

FIELD OF INVENTION

This invention generally relates to removing attack surface from devices connected to the network and more particularly but not exclusively to using the internet on a device in a manner that has no internet attack surface.

BACKGROUND OF THE INVENTION

The internet is characterized by a multitude of connected devices which communicate directly with each other. These connected devices run common operating systems and applications.

The TCP/IP protocol have not been designed with security in mind. Security concerns have risen as a result of malicious activity over the Internet. As it turns out the TCP/IP protocol along with the hosts connected to the internet are inherently susceptible to malicious attacks. This is due at least partly to the lack of secure design at their infrastructure, the operating systems using them as well as human factors such as weak passwords or phishing attacks.

The problems of internet security have been summed up by a hacker named The Lamb, who said: "There is no real safe, sacred ground on the internet. Whatever you do on the internet is an attack surface of some sort and is just something that you live with".

The current situation today is described well by the above quote but the question is stated, is there something that can be done to create a safe sacred ground on the internet that completely removes attack surface from the internet? Is the attack surface really something we must live with?

One of the objects of the present disclosure is to show how a creation of such safe ground that completely removes internet attack surface can be accomplished, without modification to the internet keeping it as it is today.

In order to create a safe place on the internet to communicate with no internet attack surface, we will look to another network that is ubiquitously deployed and that is the electricity network. The electric network transmits electricity from the electric plant to each home spanning cities and countries. The electricity travels in alternating current—AC. However when a device connects to the electric AC network it has an AC/DC adapter.

The AC/DC adapter provides two things for the device. First it disconnects the device from the AC network making it unaware of the alternating current or other users of the network. Secondly it allows the device to draw power from the AC network.

We will look into using this AC/DC model for the internet and for allowing communication over the internet with no internet attack surface. We will call our current existing internet and the devices that connect to the internet as ac devices or ac. We will call the devices that have no internet attack surface as dc devices or dc. Since this disclosure has no relation to electricity, ac devices will be used throughout this disclosure for the internet connected devices while dc devices will be used throughout this disclosure as the isolated devices.

In this disclosure we will present a dc environment or dc domain for using and communicating over the internet with no internet attack surface. Removing attack surface from the internet includes several aspects put together as follows. A dc device may be connected to ac devices or ac internet using an ac/dc adapter. The ac/dc adapter has the roles of separating dc data from ac universe as well as the containment of dc data within the dc device. The ac/dc adapter is the starting point of the user dc environment. The ac/dc adapter only executes signed programs, preferable small programs with no OS. The signed program completely separates the dc device from the ac device as well as controls the dc device for loading its authenticated image and for rebooting it at various times. A booting reset of the dc device by the ac/dc adapter may take place at every application completion time so that no leftovers from a previous instance are left.

A user is able to interact with the dc device through a dc terminal. The dc terminal may use the ac device terminal, which may be referred to as the user internet connected device input/output interfaces, while maintaining the isolation of the dc device. The dc terminal may use an authenticating image presented to the user in order to authenticate the dc device to the user. The dc terminal and authentication image are explained in U.S. patent application Ser. No. 14/231,482 and Ser. No. 14/231,500 by the present inventor and are brought in their entirety here. These applications will be referred to in the present disclosure as the initial applications.

The removal of attack surface from the network or internet for a dc device is meant that the attack surface from the ac domain is halted at the ac/dc adapter which forms a separation or a barrier, between the domains as well as isolate each dc instance from other dc instances.

A dc device is able to communicate through the ac/dc adapter, with a dc server in the dc domain. This means that the dc device is able to communicate with the dc server over the internet with no internet attack surface. This may take place for example, by manufacturing the ac/dc adapter next to the dc server and pairing them to communicate in the dc domain.

This way a user may use the dc terminal to communicate with the dc server as well as with other dc devices of other users over the internet with no internet attack surface.

The uses for such a dc domain and its applications may be authentication with no need for passwords, sending email messages, chat, payments, purchases, cloud applications, document handling and sharing, file handling, medical devices, SMAC and so forth, all over the internet with no internet attack surface.

Specific cases for utilizing the dc domain may be digital wallet, IoT and smart vehicles, all communicating over the internet with no internet attack surface. Browsing the web on the dc as well as content sending and advertising in the dc domain is explained, taking place over the internet with no internet attack surface.

Also discussed are server frameworks in the dc domain. Such dc server frameworks may serve various requirements in the dc domain such as content and ad serving, document editing for single and multiple users, mail services, payment services, web browsing, anonymizers, web browsing and user authenticators, various database uses, digital voting as well as others.

Such services in the dc domain may be used for example using user applications or through the cloud using cloud storage and a cloud secure framework.

Such secure services may allow a user to view secure content, receive secure ads relevant to the secure contents, click on these secure ads to securely purchase and pay for the goods or services all within the dc universe, making the dc universe a full environment that is similar to the current ac universe but with no internet attack surface.

The advantages of using the dc device may include anonymity, securing content, securing ads serving, secure online document sharing, secure IoT, securing vehicle computing systems and communication, securing medical devices and SMAC and generally securing services over the internet. In addition to these, there is also the additional possibility of eliminating passwords, ending email spam, end of phishing, end of social engineering, end of the trust model and certificate authorities, controlling document and data such as being allowed to read/modify/send onwards/delete/notify originator of forwarding a document, mobile financial services, mobile payments, authentication, secure online document support also for multi users, anonymizing data access, working with CDN servers for supporting the dc domain for serving content etc.

The prevention of phishing, Trojans, malware, key loggers, screen capture and so forth in the dc domain is important in order to establish the isolated dc environment separately from the current ac environment. This means that setting key loggers and screen captures on the ac device will not affect the dc device.

The platforms that the dc environment can work on is not limited and includes PCs, mobiles. Tablets, smartphones, IoT, medical devices, vehicles, SMAC, cloud, server infrastructure, automobile etc., including communication among these devices directly.

Using the dc domain has the advantage of removing the trust model such as removing the need of certificate authorities issuing certificates for making secure connections over the internet.

There is thus a widely recognized need for isolating data in the manner described above which would work even when security of the ac, non-secure user machine has already been compromised and it would be highly advantageous to have such a method devoid of the above limitations.

SUMMARY OF THE INVENTION

A system and method is presented for communicating and using data over the internet with no internet attack surface. An isolated dc device is configured to communicate with a dc server over the internet with no internet attack surface. The dc device may connect to a dc terminal for a user to communicate with the dc device in a way that is isolated from devices that connect to the internet, referred to as ac devices. A dc device and a dc terminal may be implemented as part of an ac device and in some implementations the dc terminal uses the same terminal of the ac device in part or in whole.

The communication between the dc device and the dc server may take place through an isolating device referred to as an ac/dc adapter. The dc device connects to the ac/dc adapter which in turn connects to an ac device connected to the internet. The ac/dc adapter separates the dc device and isolates each dc instance from other dc instances. In some embodiments the ac/dc adapter is paired with the dc server upon manufacturing.

Applications for the system and method includes user authentication, user payments, purchases, message communication such as email and chat, document editing and sharing by multiple users, web mail, web browsing, IoT, smart vehicles, serving content, ad serving, financial applications etc.

The system referred to as a dc device and dc terminal may be used in conjunction with a user machine ac device such as a PC, laptop, mobile, tablet, smart watch and so forth, all which may have internet attack surface, while user experience seemingly takes place entirely through the ac user device. Data in the dc domain remains without internet attack surface even if the ac domain user device has been compromised.

Furthermore, according to one aspect of the present invention, there is provided system for processing data with no network attack surface comprising:
dc device for processing data with no network attack surface;
dc server configured for communicating with said dc device over the network with no network attack surface said dc server comprising one or more servers for serving said dc device whereby said dc device processes data and communicates data with said dc server over the network with no network attack surface.

According to a second aspect of the present invention, there is provided a method of using a dc device with no network attack surface comprising:
a. processing data in said dc device with no network attack surface;
b. communicating data processed in said dc device to dc server over the network with no network attack surface;
c. processing data received through communication with said dc device in said dc server wherein data from said dc device is received over the network with no network attack surface.

According to a third aspect of the present invention, there is provided a method of sending data to a dc device with no network attack surface comprising:
a. processing data in dc server for said dc device
b. communicating data processed in said dc server to said dc device over the network with no network attack surface
c. processing data received through communication with said dc server in said dc device wherein data in said dc device is processed with no network attack surface whereby data from said dc server is received and processed in said dc device with no network attack surface.

Unless otherwise defined, all technical and scientific terms used herein have the same meaning as commonly understood by one of ordinary skill in the art to which this invention belongs. The materials, methods, and examples provided herein are illustrative only and not intended to be limiting Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

Figure 1A:
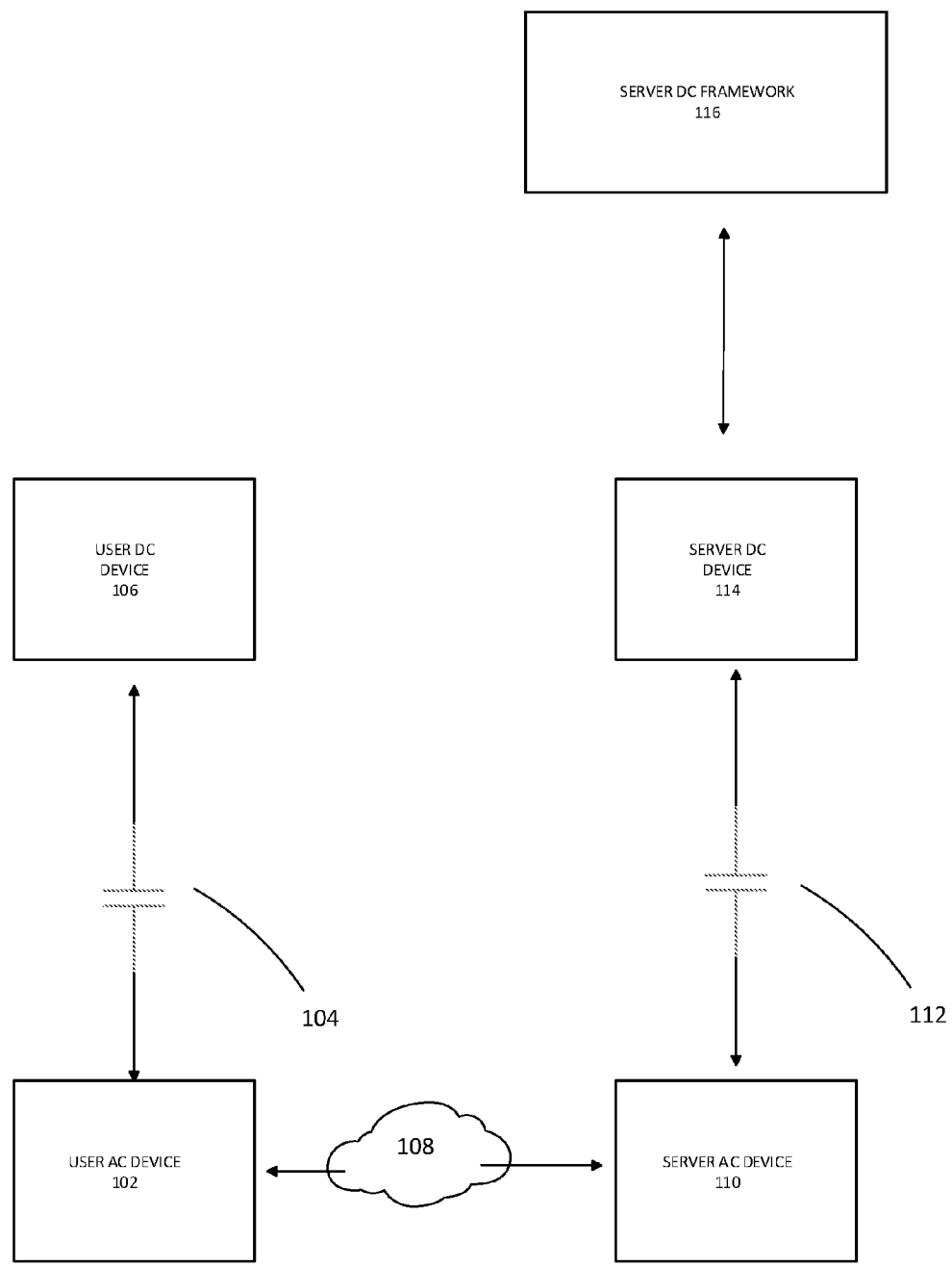
FIG. 1A is a which is a block diagram illustration of a dc device connected to a dc server framework, in accordance with an embodiment of the present invention.

It will be appreciated that, for simplicity and clarity of illustration, elements shown in the figures have not necessarily been drawn to scale. For example, the dimensions of some of the elements may be exaggerated relative to other elements for clarity. Furthermore, where considered appropriate, reference numerals may be repeated among the figures to indicate corresponding or analogous elements.

DESCRIPTION OF THE PREFERRED EMBODIMENTS

The preferred embodiments teach removing of internet attack surface from devices communicating over the internet. Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

The present invention includes several embodiments that can be realized for removing internet attack surface from a certain type of devices communicating over the internet. In this disclosure, these devices are defined and described. The devices can communicate with no internet attack surface over the internet using a server framework operating with no internet attack surface to offer support for many of the applications over the internet such as user authentication, email, chat, payments, purchases, document sharing, cloud applications, financial applications, medical applications, business applications, IoT, Vehicles web browsing etc. Content including ads is supported for delivery over the internet with no internet attack surface using these devices.

In order to create a domain with no internet attack surface that uses the internet we look to the electric power supply network. The electric power supply network is transmitted by the transmission of alternating-current—AC from the power plant to each home, spanning cities and countries. When connecting a device to the mains AC current, an AC/DC adapter is used between the AC power and the device.

The AC/DC adapter has two roles. The first is to separate the device from the AC power network so that the device is unaware of the alternating current or other devices connected to the AC network. The second role of the AC/DC adapter is to draw power from the AC power network to the device.

One of the motivations of the present disclosure is to attempt a similar adapter to the AC/DC adapter for devices connected to the internet. We would like to achieve separation from the internet for a device, while allowing the device to draw usage from the internet and the devices that connect to the internet.

Similarly to AC/DC we will now define the terms ac, as the internet and the devices that directly connect to it. Similarly to DC we will now define the term dc as devices that do not directly connect to the internet or to devices that are separated from the internet. We will use ac and dc for the rest of the application because no alternating current or direct current terminology is being used in this application.

As a dc device model, we will start off with a computing device, for example a raspberry pi zero device that is separated from the ac universe. It has no network, we disconnect its USB connections or any other storage or such connections. The device is an island cut off from the rest of the world. This deice as our dc device has no internet attack surface as it has no data connection to the internet.

In order to make the dc device usable from a user ac device such as a tablet, a phone a PC or a laptop, we will now introduce the dc terminal. The dc terminal enables I/O for the user to interact with the dc device. The dc terminal may be configured to use part or all of the user ac device terminal but in a preferred embodiment, not all the time. The dc terminal is connected in such a way so that display data from the dc device that is displayed on the terminal does not pass through the user device that is an ac device. Furthermore, user input into the dc device through the terminal does not pass through the user ac device. The dc device authenticates to the user through the terminal so that the user can tell the terminal is now displaying their dc device rather than the ac device.

The dc terminal requires physical presence in order to be used so that what is displayed on the terminal on the user ac device cannot be seen by someone who is not physically near the device. Furthermore the user input into the dc device through the dc terminal can only be done physically using the ac device. The dc terminal has the feature of using the same user I/O as used for ac applications. Therefore it is possible for the same display and user input mechanism to be used for both ac and dc applications.

As a result the dc device being used by the dc terminal through the ac device has no internet attack surface since the dc device does not output anything to the ac device, nor does it receive any data from the ac device.

So far we have discussed the separation property in the similarity of the electric AC/DC adapter. To the adapter we would like for the internet. We will now look at the similarity to the power drawing property of the AC/DC adapter for drawing internet capabilities to our dc device.

In order for the dc device to draw from ac we now introduce the ac/dc adapter for the network. The ac/dc adapter connects between an ac device and the dc device and has two main roles 1) Separating dc data from ac data and 2) Isolating dc application executing instances.

Separating dc data from ac data may be done for example by having a symmetric encryption key within the ac/dc adapter, a key that is never communicated in any protocol from the ac/dc adapter. A file from the dc side travelling to the ac side is signed and then encrypted by the symmetric key. When traveling back into the dc device, the file is decrypted by the symmetric key and the signature verified inside the ac/dc device. Then the file is sent into the dc device.

Furthermore, in addition to the above, isolating of dc application executing instances may be done for example by having the ac/dc adapter control a reset of the dc device as well as being in control of loading the boot image to the dc device. The dc device preferably has no nonvolatile memory and runs from RAM disk. Upon each completion of application execution in the dc device, the ac/dc adapter, which receives the completion info, resets the dc device which in turns starts booting from the authenticated image from the ac/dc adapter.

Having the dc data separated from ac as well as having the dc data isolated from other dc applications means the dc data coming out of the ac/dc adapter is only affected by the application using it in dc. Removing of attack surface area may mean that no ac can access the dc data as well as no other dc applications or other dc data.

The ac/dc adapter may have a feature of exclusively running programs which are signed by a private key which matches a public key burned to a specific location in the CPU memory of the ac/dc adapter. In some embodiments This is done using OTP or one time programmable memory. Only a signed running program has access to the key mentioned earlier in the ac/dc adapter.

The introduction of the ac/dc adapter allows the dc device to use the ac device file storage and so enable to store files and manage the file system on the ac device, leaving the dc device without the need either for a display and user I/O supplied by the dc terminal, and also no need for managing its storage. Since the dc device does not have any networking capabilities this means the dc device can be kept as a lean, simple device, such as a raspberry pi zero.

The dc device has no internet attack surface because the ac/dc adapter forms a disconnection between it and the ac internet. The ac/dc adapter allows data to travel out of the dc device only as encrypted data with the ac/dc adapter key, the key which is not sent out of the ac/dc device in any protocol. No other data may travel out of the dc device. Furthermore, the encrypted dc data coming out of the dc device is affected by the application executing instance and not by any other instance of any other or similar application. This separation means the data coming out of the dc device is contained by the present application execution and encrypted by the key within the ac/dc adapter. This separation means the removal of internet attack surface from the dc device.

The ac/dc adapter removes internet attack surface from the dc device by keeping its key from the ac device; by using the key on each message coming into the dc device and out of the dc device, and by resetting the dc device upon each application completion. The key is protected from ac since the ac/dc adapter only runs signed programs and only these signed programs may make use of its key, as explained above. The signed program in a preferred embodiment has no operating system and is a program for implementing the ac-dc separation and the containment of each dc application execution. This program should preferably be very limited in functionality, be short and easy to understand. In a preferred embodiment the SoC used to implement the ac/dc adapter has built in cryptographic functionality so the actual code to write for the ac/dc adapter is short and easy to understand with a simple state machine. Commands received from the ac domain to the ac/dc device are limited to few known short commands such as start or end application and in some embodiments, pointer locations information, movement and size of application window size, in addition to file sending commands and data. In some embodiments some of this data may be sent to the dc device.

Drawing file system services from the ac device is one of the capabilities of the ac/dc adapter. Another capability for drawing from ac is as follows. In a preferred embodiment, when the dc device is manufactured at the ac/dc plant, the key implanted within the ac/dc adapter may be saved at the ac/dc plant within a dc device which we will call the dc server.

The dc device not only can store files at the ac device but can now also write files in dc that when transmitted to the dc server may be used by the dc server. Now suppose a dc server is located at a cloud based service. This allows the dc device to authenticate to the dc server as well as to use cloud based services such as cloud file storage, cloud applications and cloud services. This is done with no internet attack surface as explained above, for the ac file usage, the only data coming out of the dc device to ac domain are files protected by the ac/dc adapter key that is not sent out of the ac/dc adapter and not communicated in the ac domain. The dc device is separate from the ac device using the key mentioned earlier and the dc device is isolated from other dc device instances. The dc terminal is useful for the user to make use of the system with no internet attack surface.

Authenticating by a dc device to a dc server is important because it could replace the need for passwords and other means of identification which cause many problems in todays internet.

Cloud usage by a dc device allows isolation of file and application usage for dc data that is not exposed to the ac device it is used through.

We now have a single user using a dc device with a dc server. If another user has a dc adapter and the two users would like to communicate in the dc domain this can be made possible through the dc server that can communicate in the dc domain with both dc devices. This allows sending a message through the internet with no internet attack surface.

The communication between dc devices over the internet through the dc server allows to transmit any kind of messages between dc devices with no special setup simply by using the device through for example, the dc terminal. This can be used for example for sending email messages, chat messages, payment information, to share documents, for cloud apps, medical apps, financial apps, banking apps etc. as well as authentication to the dc server making passwords redundant.

It is therefore that a user with a dc device that uses the device using a dc terminal can for example send an email to another user having a dc device in the dc domain, over the internet with no internet attack surface. This means that even if a user ac device is broken into by a malicious program or hacker, the user may use the dc device without exposing attack surface to the malicious program or attacker. This is relevant for any usage with the dc device as listed above as well as most other applications over the internet.

It is therefore highly advantageous to have the ability to communicate over the internet with no internet attack surface as in the above examples, as well as in other applications. More so, there are use cases where having an internet attack surface are even more critical. One such example is internet of things as will be called IoT hereon.

IoT with internet attack surface attack is a major drawback because it potentially encompasses privacy issues within the home such as camera at home and baby camera as well as safety issues in the home such as door locks controlled by IoT. There can be annoyances due to lighting and audio media and volume being played in the house as well as annoyances due to expenses for example refrigerator IoT.

The very thought of someone tampering with issues such as these draws people away from using IoT services. Therefore a dc device which may be coupled to each IoT device may offer removal of internet attack surface from IoT. This may work as follows in a preferred embodiment.

Each IoT device is coupled to an ac/dc adapter. Note there may be no need for a dc terminal for such devices. Each device is initialized, for example, at the dc server production location. Initialization includes a serial number and ac/dc adapter key. When the user receives a new IoT device, the user logs into their IoT account using their dc device and enters the serial number printed on the IoT device. The IoT account at the dc server adds the new IoT device and sends keys for the IoT devices to be able to communicate directly with each other as well as with the dc server. The IoT devices then may communicate directly with each other if internet connection fails. The user may then use their dc device equipped with a dc terminal to control and receive information from their IoT devices, all with no internet attack surface.

Another example of a case where having an internet attack surface is a critical issue is smart vehicles.

Smart vehicles with internet attack surface may potentially risk lives. The thought of a hacked smart vehicle which may alter its navigation system, its internal systems such as the brakes during a ride poses a danger to the passengers. Similarly to IoT the systems within the smart car can communicate within the car and out in dc domain. A vehicle may also have a user terminal which may be using the dc domain and in some embodiments, IoT may have them too.

It is therefore that not only is it advantageous to have a dc system in place for various applications it is a must have for some of the present evolving applications.

There is another issue worth mentioning in relation to smart vehicles and that is content, either commercial or non-commercial content, as well as ads. Smart vehicles require content in various parts of the system such as in the navigation system and entertainment system. Passengers may receive information and ads based on their locations and previous preferences.

The only one who knows who owns the smart vehicle is the dc server. Regarding the delivery of contents and ads to the smart vehicle, only the dc server can deliver the content. Therefore the dc server is the only one to match and deliver content and ads to the vehicle. It is also worth noting that IoT may have content and ad context as well, for example, a refrigerator noticing the apple juice is almost done informing you of a special deal on another brand apple juice you do not normally use or giving you a discount if you buy now, etc. Similarly, the only one who can send your devices the content is the dc server.

How about browsing the web in dc domain? Browsing the web today has the user at the center where the user requests a web page from site A, then roughly speaking, receives a page with links to the publisher ad server which in turn return links to advertiser ad server which in turn return a link to a local CDN server such as Akamai to return the locally cached ads.

Browsing the web in dc domain may be different. A possible way is for the user to send a URL request to a local dc server such as one located at a local CDN.

The dc server then does the actual page fetch, the request for the publisher ad server and the request to the advertiser ad server, constructing the entire web page from local cache and returning the fully prepared page back to the user in dc domain.

In such a scenario, only dc server knows who the actual user requesting the page. This is because the requested page is no longer requested by the user directly. Therefore the dc server may be the only one to match and deliver ads to the user in dc domain exclusively.

This disclosure focuses on a single dc device. However multiple dc devices may exist in an embodiment. Copy and paste between different running dc devices may be implemented and allowed based on authorization of each running dc application. Multiple dc devices may exist in a single chip, handled by an operating system with a GPU for handling the dc terminal of the various dc devices and so forth.

Communication in dc domain takes place between identified parties so that unlike the internet protocol where every machine can send a packet to any machine with no identification, in dc it may be enforced that each message is from an identified and welcomed dc device to another specific identified dc device. Within the identified device the packet is directed to a specific running application with a given instance number. This is in relation to the port number used in the internet protocol.

Server farms may include dc server farms to be part of the dc domain to connect between dc devices and send various content to these devices as described above.

Direct point to point communication between dc servers may be set up for specific tasks by a dc, such as in IoT dc devices.

A note regarding the provisional application which the present application claims priority of. This note is also relevant to the initial applications. Those mentioned applications refers to a parallel universe or parallel world, Versus a current world or universe. The dc domain stands for the parallel world or universe while the ac domain stands for the current world or universe. The change in terminology has been made to define the dc domain more distinctively as isolated island in addition to being separated from ac. This way if a contamination to a dc device takes place, the isolated feature of the dc device will contain the contamination which will not affect other dc instances in the same device as well as other communicated instances in the dc domain. See further information regarding the containment feature of the dc device. Any place in those applications where it says parallel world or parallel universe, replace it with dc and the same for ac to replace the current world or current universe. The provisional application is copied to this application here in its entirety, as well as the initial applications.

In order to solve an attempted imitation of impersonating another party in dc using another dc device, a mitigation may take place to print on the authentication message the name of the party the dc session or message is to be sent to. For example this may be another user name, a company name, a service name, an application name etc.

The term ac domain or ac is used throughout this disclosure to specify a domain that is connected to the network including various devices and media that connect directly to the network or connect to devices that connect to the network. Devices in this domain are prone to cyber-attack.

The term dc domain or dc is used throughout this disclosure to specify a domain or a device that is disconnected from ac devices access. This domain is separated from the network yet is able to draw communication from the network with no attack surface from the network and from the devices connected to the network. Messages may be sent in this domain through the network with no attack surface from the network.

In some embodiments the network in the term dc and ac is the internet.

The term terminal is used throughout this disclosure as input/output means for a user such as a touch screen where the user views and can enter touch events, and such as a display, keyboard and mouse in case of a pc or laptop. The term dc terminal is used for specifying input/output means in the dc domain where the input/output means are not accessible from ac domain such that no device accessible to the network has access to the user input and output. The term ac terminal is used for specifying input/output means in the ac domain where the input/output means are accessible to the ac domain such that device accessible to the network has access to the user input and output.

The term disconnection unit also referred to as ac/dc adapter stands for a unit which disconnects the ac domain from the dc domain as well as isolates dc application instance from other dc application instances.

The term combined disconnection stands for a unit combining ac device connecting to the network with ac/dc adapter in a single descriptive unit which may be implemented as a single device but not necessarily. This unit is connected to a network on one side and to a dc device on the other.

The term dc message refers to messages sent in the dc domain. It may have an identified sender and receiver, an application name and specific instance as well as other identifying data.

The term user machine or user device used throughout this disclosure may generally refer to a device such as a computer, a laptop, tablet, smart-phone or any other computing device that may connect to the network and optionally external media and may be exposed to external attacks such as through the network. The term may also refer to a computing unit connected to the network that serves as a unit for handling communications while a user may control a device that uses the unit for communicating indirectly through the network. A connection to the network may be through any connection, wired or wireless.

Reference is now made to FIG. 1A, which is a block diagram illustration of a dc device connected to a dc server framework, in accordance with an embodiment of the present invention comprising user ac device 102 such as a PC, a laptop, a tablet or a smartphone, connected to a user dc device 106 through ac/dc adapter 104 marked as a disconnection unit denoted by a disconnection drawing 104. The disconnection of the ac/dc adapter stands for the separating between the ac device and the dc device as well as isolating the dc execution environment. Together these allow for the removal of attack surface of dc data from ac domain and from other dc data and applications. In the present embodiment the disconnection stands for the removal of attack surface and means that the only data that comes out of the user dc device 106 into user ac device is data encrypted by ac/dc adapter 104 to be used only by another dc device, one that the ac/dc adapter authorized to use or for use by itself.

In a preferred embodiment, the user dc device 106 is a separate physical execution environment to the user ac device 102 for removal of attack surface where connection between the user ac device and the user dc device is through the ac/dc adapter. In some embodiments the user ac device 102 may pass certain commands as well as user machine display to the user dc device 106. Further in FIG. 1A user ac device 102 is connected through network 108 to server ac device 110. Server ac device 110 connects to server dc device 114 through server ac/dc adapter 112 marked as a disconnection unit, which is similar to the explanation of unit 104. The server dc device is a separate physical execution environment to the server ac device 110. Server ac device 110 may pass commands and in some embodiments data to server dc device 114. Server dc device 114 is connected to server dc framework 116.

The following describes passing dc data over the internet with no internet attack surface. User dc device 106 passes dc data to server dc device 114 through the ac/dc adapters 104 and 112. User dc device 106 passes user dc data through the user ac/dc adapter 104 such that the user dc data coming out of user ac/dc adapter 104 is not accessible in ac. Furthermore the user dc data is isolated from any other dc data and other dc executing application in the user dc device 106. This may take place as the user dc device 106 is reset and freshly loaded into user dc device RAM with a running image through the user ac/dc adapter 104 so that the user dc data is isolated from ac and any other dc data or application previously running on the user dc device 106. The user dc data is encrypted by the user ac/dc adapter 104 with the user ac/dc adapter key to protect from ac access and from unauthorized dc access. The user dc data travels through the user ac device 102, through the internet 108, to the server ac device 110 where it is all inaccessible, and is decrypted by the server ac/dc adapter 112 into the server dc device 114 in usable form. The server dc device may be reset and freshly loaded into server dc device RAM with a running image through the server ac/dc adapter 112 so that the user dc data is isolated from ac and any other dc data or application previously running on the server dc device 114. As a result, user dc device 106 may pass dc data to server dc device 114 through the internet with no internet attack surface. Similarly, the server dc device 114 may pass dc data to user dc device 106 through the internet with no internet attack surface.

A few points to be clear regarding the above is that the key within the user ac/dc adapter is not communicated in any protocol and therefore not available in ac. The key in the user ac/dc adapter is copied during manufacturing to the server ac/dc adapter. The ad/cd adapter is made with a special hardware chip that does not run programs that were not signed with a private key whose public key is burned into a specific one time programming memory within the hardware chip. Only a signed program running may access the key of the ac/dc adapter. These together allow for passing messages through the internet with no internet attack surface.

With a user dc terminal as explained in the dc-terminal application, this allows for a user to use applications through their usual display and input devices through the internet to a dc server with no internet attack surface. We will discuss this issue more thoroughly in FIG. 1D.

The server dc framework 116 receives dc data from the server dc device 114 and handles it in a dc environment, for example, an environment that isolates it from other dc data and other dc applications. Such dc framework may be any framework for any type of service. These services are operated through the internet with no internet attack surface as discussed above. Here are some examples for dc framework services: A dc file cloud for serving dc files to users through their dc device; A dc authentication service for allowing users to authenticate to the server with their dc device; A dc payment service for allowing users to pay in dc using their dc device; A dc email service for allowing users to compose and send messages in dc to other users in dc using their dc device. Note this can be the entire email message or part of it, for example, a dc message sent as attachment with a regular ac email; A dc chat service for allowing users to send a chat message in dc using their dc device; A document service for allowing users to read and edit documents in dc using their dc device; A cloud app service for allowing users to use a cloud app in dc using their dc device; A medical information service for allowing users to receive and edit medical information in dc using their dc device; A medical device for allowing users to receive information from and command a medical device in dc using their dc device; A banking app for allowing users to receive information from their bank and give financial instructions in dc using their dc device; An IoT app for allowing users to receive information from their IoT devices and give instructions to their IoT devices in dc using their dc device; A smart connected car for allowing various vendors to interact with the car and its parts in dc using their dc devices. Etc.

In some embodiment the server dc framework 116 does not have access to some of the dc data in the server dc device 114. Such of the data accessible may be metadata information or partial data of the dc data while other data may not be available. In another embodiment the server dc framework 116 does not have access to any of the dc data in the server dc device 114.

As listed in the examples for the uses of the dc framework, it is evident that the uses for such a system for sending messages over the internet which removes internet attack surface, are in almost every aspect and any application that is in use today. For every need where data is transferred over the internet, a dc device may be used to remove internet attack surface from the data transferred, for gaining privacy and security. These uses signify the need for such a system and in the following figures we will show in detail the various aspects and uses of this system.

Figure 1B:
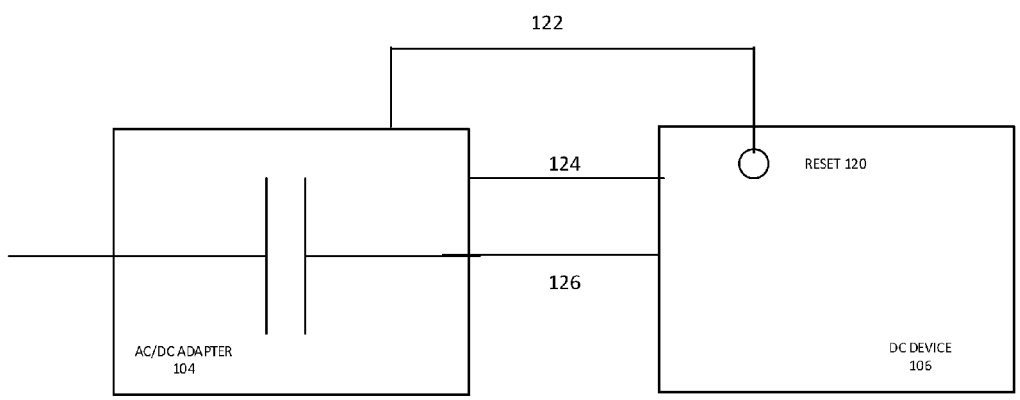
FIG. 1B is a block diagram illustration of an ac/dc adapter isolation of dc data within a dc device in accordance with an embodiment of the present invention.

Reference is now made to FIG. 1B, which is a block diagram illustration of an ac/dc adapter isolation of dc data within a dc device in accordance with an embodiment of the present invention comprising ac/dc adapter 104 and dc device 106 as explained in FIG. 1A. The dc device 106 has a reset switch 120 which is controllable by ac/dc adapter 104 through connection 120. There is also a connection between ac/dc adapter 104 and dc device 106 for loading image of dc device. The image of the dc device is signed and authorized by the ac/dc adapter 104. Upon initial work and every time an application finishes, the ac/dc adapter resets the dc device and loads the dc device with an authenticated image. In a preferred embodiment the dc device does not have non-volatile memory and its in-use memory is in RAM. Therefore an application using dc data is isolated from other applications and dc data used on the same device previously.

If malware somehow manages to make its way into the dc device, such as if a malicious user opens up their device and implants a malware, that malware is contained by the system as follows. The malware is not able to communicate outside the dc device 106 because it is isolated by the ac/dc adapter 104. Furthermore it cannot make changes that will influence other applications and other dc data because upon completion of running the application the ac/dc adapter resets the dc device. Therefore the malware remains contained within its file and cannot spread.

Figure 1C:
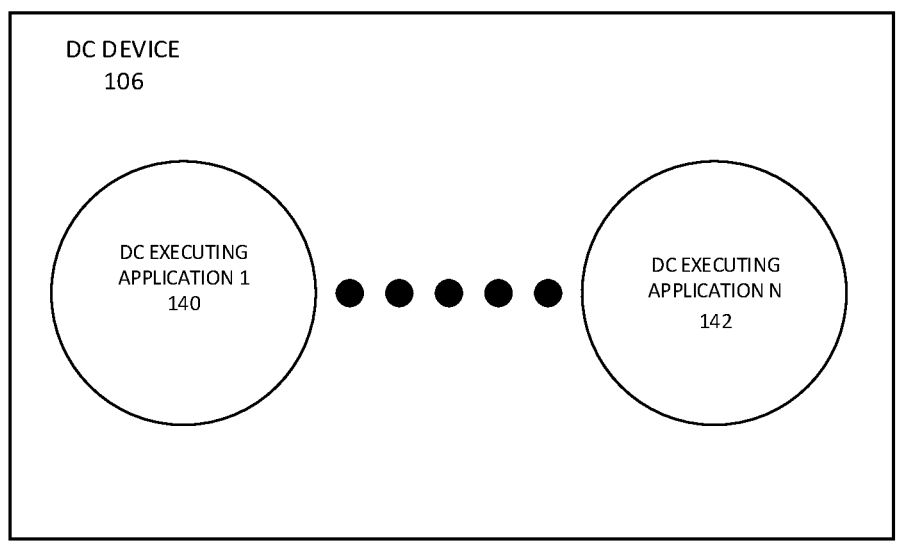
FIG. 1C is a block diagram illustration of a dc device executing an application in accordance with an embodiment of the present invention.

Reference is now made to FIG. 1C, which is a block diagram illustration of a dc device executing an application in accordance with an embodiment of the present invention comprising dc device 106, as explained in FIG. 1A and FIG. 1B. The dc device 106 executes a single application each time from application 1 140 optionally making use of dc data 1 continuing to application N 142 optionally making use of dc data N. Each of these applications making use of corresponding optional dc data is unaffected by other dc applications and other corresponding optional dc data as a result of the isolation of dc device 106 by ac/dc adapter as explained in FIG. 1B.

Figure 1D:
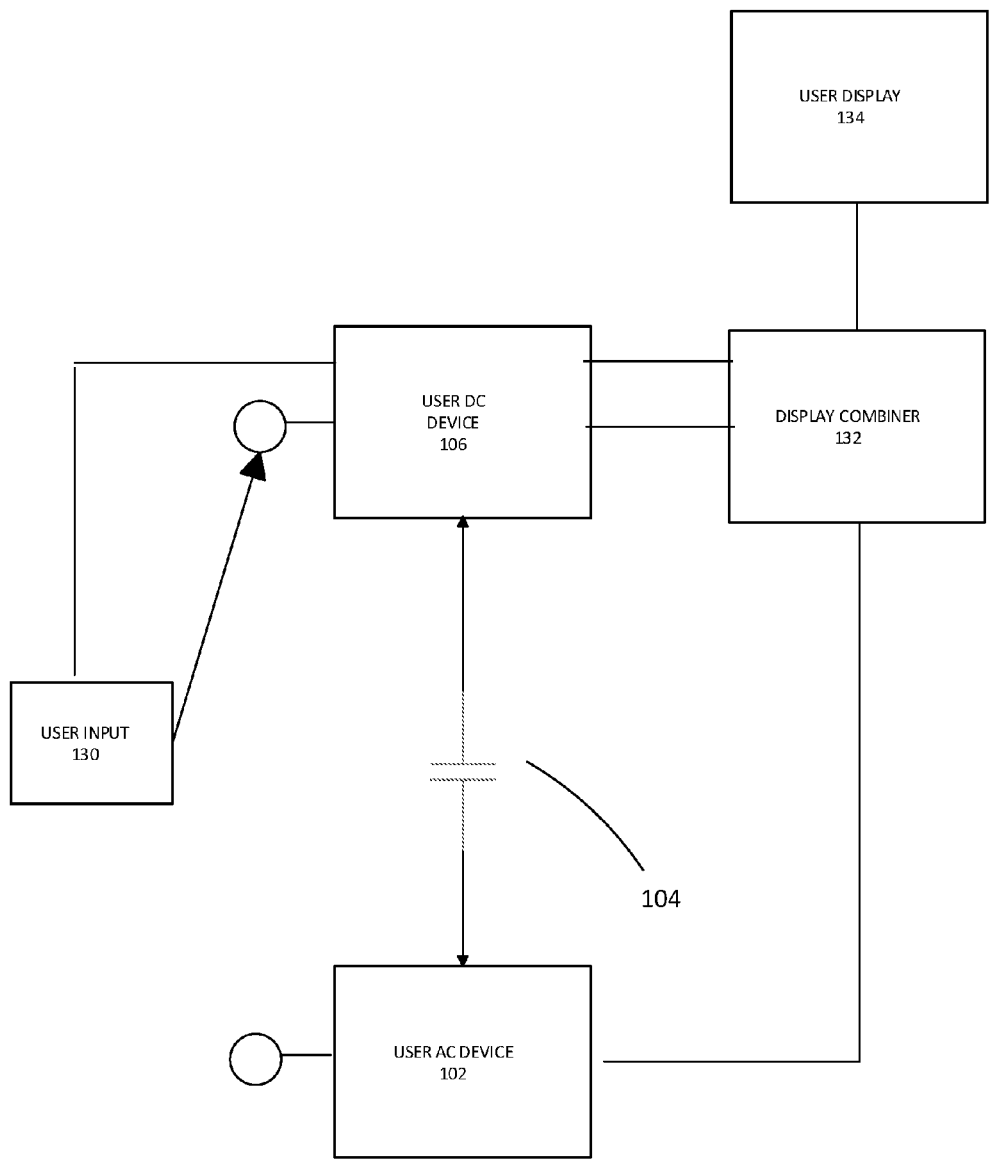
FIG. 1D is a block diagram illustration of a dc terminal used with a dc device and ac/dc adapter in accordance with an embodiment of the present invention.

Reference is now made to FIG. 1D, which is a block diagram illustration of a dc terminal used with a dc device and ac/dc adapter in accordance with an embodiment of the present invention comprising user ac device 102 connected to user dc device 106 through ac/dc adapter 104 as in FIG. 1A. User input 130 which may be a keyboard and mouse, a touch screen or any other type of input device is connected through a switch to one of either dc device 106 or ac device 102. The dc device 106 controls which device the user input 130 is currently connected to. The Fig. further comprising display combiner 132 which is connected to both display outputs of ac device 102 and dc device 106 and outputs a single display image to user display 134. Display combiner 132 is controlled by dc device 106.

When a user request use of a dc application, the dc device creates a window for the application on the user display 134 using the display combiner 132, displaying dc display output of the dc application. At this time the dc device direct user input into the dc device. We will refer to the displaying of the dc device and the input of user input device into dc device as the dc terminal.

In order to let the user know the dc device is in operation, in a present embodiment, the dc device displays an image familiar to the user that is kept in dc domain. This way the user can tell of use of the dc terminal using their own display and input peripherals.

The dc terminal does not add an attack surface to our system because the user input is only directed to the dc device when using the dc terminal and the user input is only directed to the ac device when using the ac device. Furthermore, the output display from ac device is directed as is to the user display 134 through the display combiner 132 and does not offer a surface attack.

In some embodiments display output from ac device 102 is connected into display input within dc device 106 and the display output of dc device 106 is connected to user display 132. In such a case the display combiner 132 is implemented within dc device 106.

In FIG. 1A-1D we have showed how a user may interact using their own device input and output peripherals with a server over the internet with no internet attack surface.

Figure 2A:
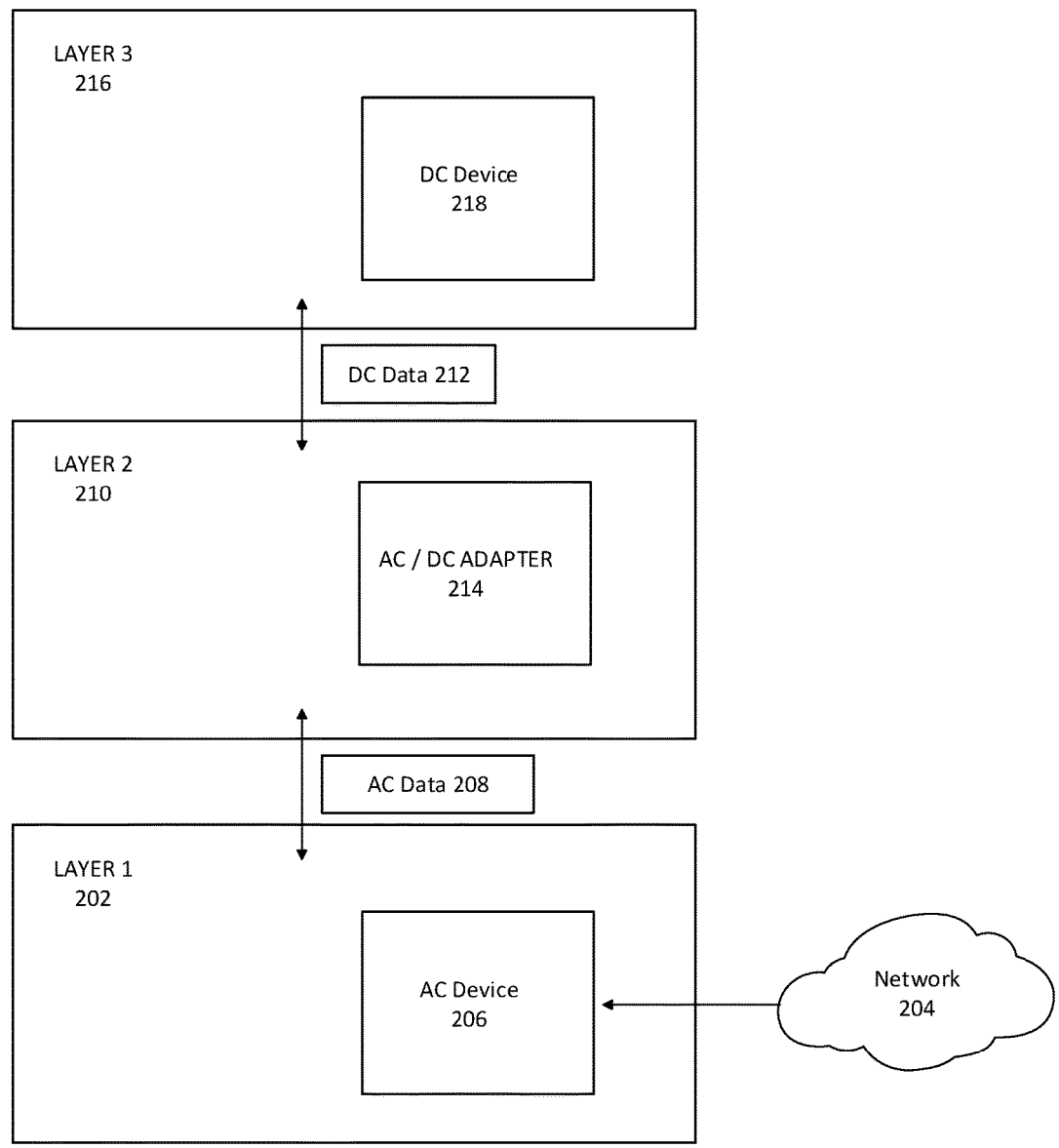
FIG. 2A is a block diagram illustration of the layers separating the dc device and the ac network connected device, in accordance with an embodiment of the present invention.

Reference is now made to FIG. 2A, which is a block diagram illustration of the layers separating the dc device and the ac network connected device, in accordance with an embodiment of the present invention comprising layer 1 ac domain or ac layer which includes ac device 206. Layer 1 202 communicates ac data 208 with layer 2 210 which includes ac/dc adapter 214. Layer 2 210 communicates dc data 212 with layer 3 216 which includes dc device 218 as well as other dc frameworks not shown in the fig. Layer 1 is connected to the network 204.

Layer 1 is considered prone to cyber attack and for discussion we assume the devices in this layer are all infected by malware, controllable by $3^{rd}$ parties having key loggers and snapshots of the display etc. Layer 1 may include all functions and devices reachable from the ac device, such as file system in the ac device which is equally accessible to attacks on the ac device. Layer 2 provides a separation between layer 1 and layer 3 so that no data usable in layer can pass to layer 3. Furthermore layer 2 provides a separation so that data usable in layer 3 can pass through to layer 1.

The separation may be a physical separation through using different hardware devices, such as a using a separate hardware connected to the network for layer 1 which is separate to the secure device. The layer 2 may be implemented with another separate device. In a preferred embodiment the ac/dc adapter is a hardware device that does not let clear data leave the dc device to the ac device. The device in layer 2 may be a device that does a simple serial task with no operating system that can be easily checked, the code run by the layer 2 device may be authenticated by the hardware device which exclusively runs authenticated code.

Figure 2B:
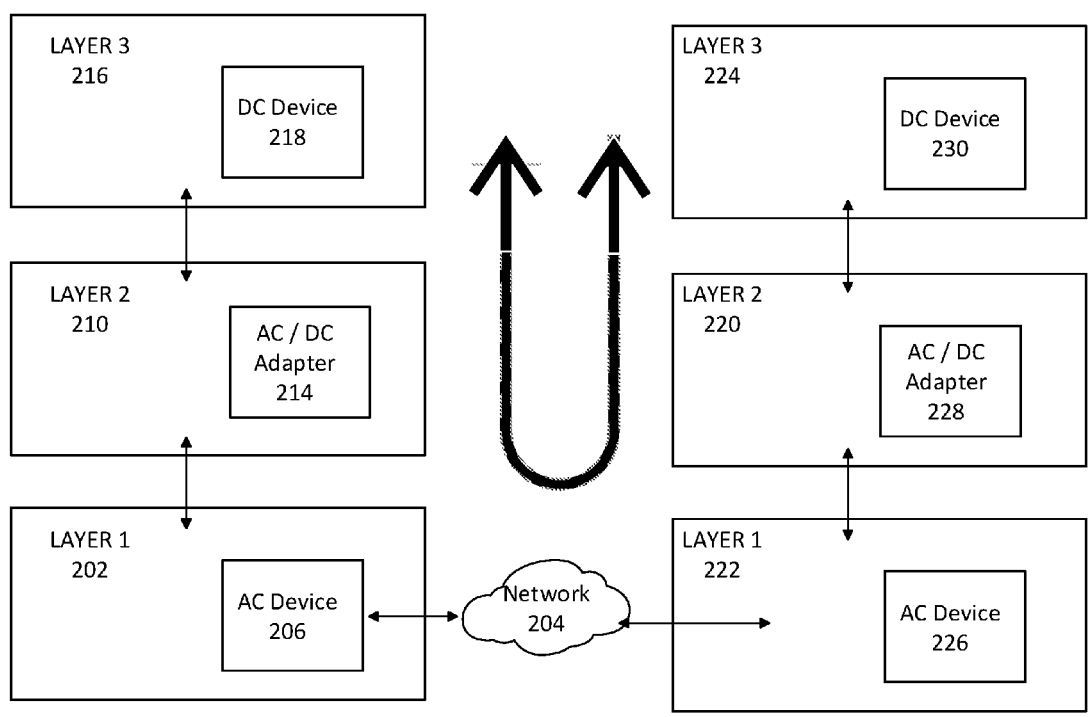
FIG. 2B is a block diagram illustration of the layers separating two communicating dc devices from ac domain, in accordance with an embodiment of the present invention.

Reference is now made to FIG. 2B, which is a block diagram illustration of the layers separating two communicating dc devices from ac domain, in accordance with an embodiment of the present invention comprising FIG. 2A layers and devices, layer 1 202 with ac device 206 in layer 1; passing messages with layer 2 210 with ac/dc adapter 214 in layer 2; passing messages with layer 3 216 with dc device 218 in layer 3. Ac device 206 in layer 1 is connected to the network 204. Further to FIG. 2A there is connected to the network 204 a second system with similar layers and devices as follows. Layer 1 222 with ac device 226 connected to network 204 in layer 1. Layer 1 is connected to the network and is prone to cyber-attacks from the network. Layer 1 is passing messages with layer 2 220 with ac/dc adapter 228 in layer 2. Layer 2 is passing messages with layer 3 224 with dc device 230 in layer 3. Similarly to layer 2 210 and ac/dc adapter 214 this layer separates layer 1 from layer 3. A "U" is shown in the fig. between layer 3 216 and layer 3 224 to signify passing of dc messages between layers 3 such that these messages are passing with no attack surface from ac domain and unaffected by ac domain. Messages between layer 3 devices pass through ac domain but the ac domain cannot read or alter these messages.

In a preferred embodiment, technical details are as follows. The ac/dc adapter is implemented by a standalone SoC such as Analog Devices BF707, which can be configured to exclusively execute signed code with a public key burned into a predetermined memory area which is OTP standing for one time programmable, so can be written to only once. The code for the ac/dc device separates layer 1 and layer 3 and isolates currently executing dc application from other dc applications previously executed.

The separation is done as follows. Having the dc device connected through the ac/dc adapter to ac device, the ac/dc adapter passes from ac only encrypted data which it can decrypt with its key and then check a secure hash algorithm signature sent along with on the data, such as SHA-1, SHA-2, SHA-3 etc. Similarly from dc messages are signed with a secure hash algorithm and then encrypted by the ac/dc adapter before passing to layer 1.

The isolation of currently executing dc application from previously executing dc applications may be done by having the dc device having no non-volatile memory and rebooting it from an authenticated image each time an application ends. Booting the image of the dc device is made by the ac/dc adapter which has the ability to reset the dc device, check an image for authenticity and sent it for dc device boot. Having the dc device separated in this way allows it to pass messages through the internet yet be with no internet attack surface.

That means that even if a malware makes its way into the dc device, it stays locked in to that instance and that file and cannot spread. This shows that the removal of attack surface is not only from the outside ac domain bit that the removal of attack surface is also from within the dc domain. A dc application instance has no attack surface from without and from within and is an isolated island which may interact with a user through a dc terminal. It is this that helps make this approach unique in removing of attack surface.

The dc device is a verified device by another dc device such as a dc server. Having verified devices communicate and having them with the removal of attack surface adds the ability to authenticate communication. This may mean physical access to a dc device but not necessarily a specific person physically accessing the dc device. An added fingerprint reader may be combined with the dc device to also authenticate a specific person in addition to a physical dc device verification.

The authenticated communication prevents eavesdropping and spoofing of messages as well as protection against sending messages to unintended recipients by mistake.

Using dc devices may offer simple dc communication without requiring to set up any special program or codes to secure communication. Using of the dc domain inherently secures and authenticates communication between dc devices.

Figure 3A:
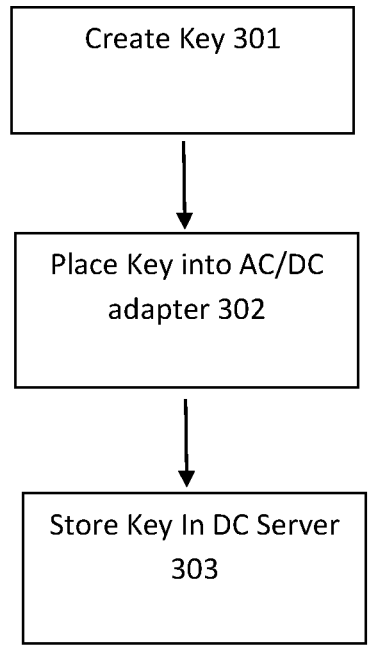
FIG. 3A is a schematic flowchart for steps carried out when a dc device is manufactured and used, in accordance with an embodiment of the present invention.
Figure 3A:
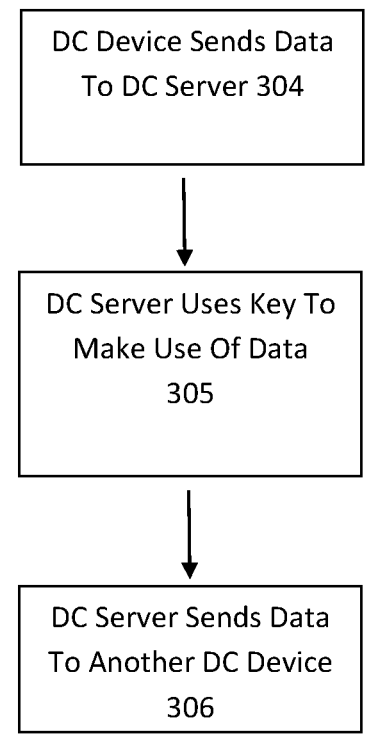

Reference is now made to FIG. 3A, which is a schematic flowchart for steps carried out when a dc device is manufactured and used, in accordance with an embodiment of the present invention;

In step 301, a key is created. This may be a symmetric AES 256 encryption key.

In step 302, the key from step 301 is placed into the ac/dc adapter. This may be a one-time programmable memory or OTP, within a SoC.

In step 303, the key from step 301 is stored in a dc server. The dc server may include one or more devices similar to the ac/dc adapter which protects the key for example by a hardware SoC which exclusively runs code that is signed for execution only on said SoC instance.

In step 304, dc device sends data to dc server. The dc data is encrypted by the key within the ac/dc adapter created in step 301. This step does not follow after step 303 directly.

In step 305, dc server makes use of the key to use the data. This may take place by a ac/dc adapter at the server.

In step 306, the dc server sends data to another dc device. This way two or more dc devices may communicate with each other through a dc server when each dc device may only be able to directly communicate with the dc server.

These steps show the possibility of communicating between several dc devices in the dc domain. These steps also show the ability to communicate between two or more dc devices through a dc server when each dc device may only be able to directly communicate with the dc server.

Figure 3B:
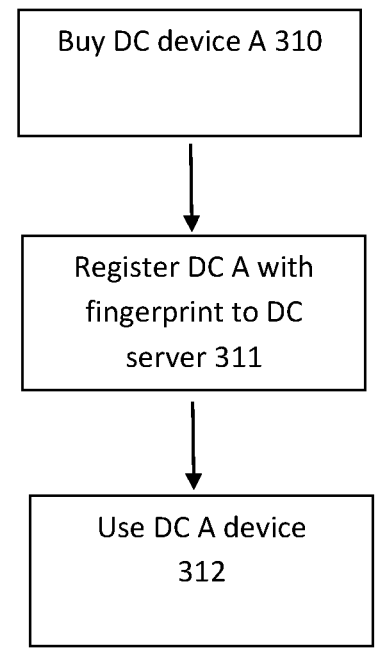
FIG. 3B is a schematic flowchart for steps carried out when a dc device is purchased by a user, in accordance with an embodiment of the present invention.
Figure 3B:
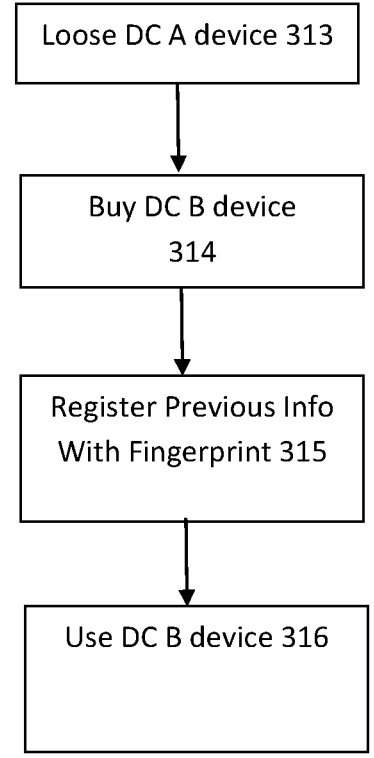

Reference is now made to FIG. 3B, which is a schematic flowchart for steps carried out when a dc device is purchased by a user, in accordance with an embodiment of the present invention;

In step 310, a user buys dc device A.

In step 311, the user registers the dc device to the dc server with a fingerprint. The fingerprint is optional and may also be a password or other data that singles out the user, for example a passport photo, a notary signature of identity proof and so forth.

In step 312, user uses the dc device to communicate with the dc server and with other users or services in dc.

In step 313, user loses their dc A device. This step does not follow from step 312 directly. The user may inform the dc server of the lost device.

In step 314 user buys dc B device as a replacement.

In step 315, user registers dc B device with fingerprint or other authentication methods as described in step 311.

In step 316, following authenticating the user with the dc B device, the user continues to work with all data available to dc A device on the dc server available to through the new dc B device.

This is possible because the dc server has access to the files as explained in FIG. 3A. Following the user registering the dc B device, the dc server makes the files accessible through dc B device because the key to dc B device also exists at the dc server and the dc server can get the user files and send them to the user with device B key.

If the user stores dc files on the cloud using dc A device, for example, either uploading files, saving files to the cloud or creating them through dc cloud apps, the files are now usable with dc B device.

These steps show that losing a dc device is comparable to losing a thumb drive or losing your laptop, meaning that you lose the files physically on it. However, if you stored copies of the files on the cloud you will be able to access them with a new device.

Figure 4A:
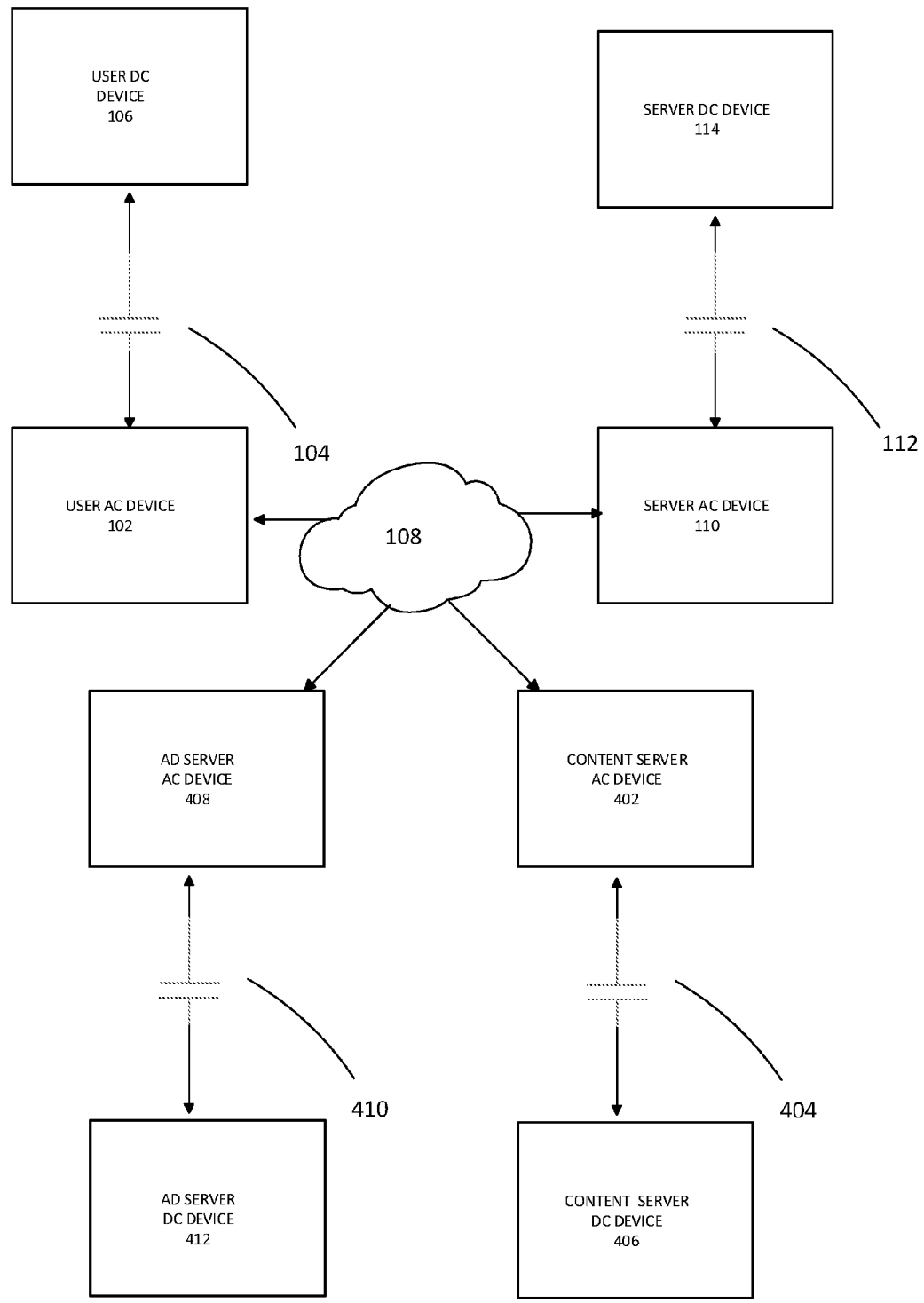
FIG. 4A is a block diagram illustration of a dc publisher for receiving dc contents and dc ads, in accordance with an embodiment of the present invention.

Reference is now made to FIG. 4A, which is a block diagram illustration of a dc publisher for receiving dc contents and dc ads, in accordance with an embodiment of the present invention comprising similarly to FIG. 1 user ac device 102 connected to a user dc device 106 through disconnection unit 104 or the ac/dc adapter. The user ac device 102 is connected through the network 108 to server ac device 110. The server ac device 110 is connected to server dc device 114 through disconnection unit 112 or ac/dc adapter. Now turning this setup to serving content, publisher with ac server 110 and with server dc device 114 has contents to be served in the dc domain to the user. The publisher dc device 114 is communicating with dc content server 406 and dc ad server 412 for serving contents and ads to a user in the dc domain. dc content server 406 is connected through disconnection unit 404 to ac content server 402 which is connected to the network 108. Dc ad server 412 is connected through disconnection unit 410 to ac ad server 408 which is connected to the network 108

The dc server framework as discussed in FIG. 1 may be viewed in this fig. as made of the dc content server and dc ad server for serving content with ads to a user in the dc domain. This framework of content and ads is simplified to present the ability of serving contents and of serving ads originating in the dc domain within the dc domain to a user through the user machine. The dc server framework may be made up of many devices and may be situated in different locations and handles by multiple organizations as is common in content and ad serving. In some embodiments additional information regarding user information for ad serving may be received from another organization which may take place in the dc domain. The drawing is meant to simplify the explanation of content serving and ad serving in the dc domain. In addition to the content serving in dc, it is now possible to serve contents and ads so that the originator of this content and ads does not know which user actually receives the contents.

As an example of receiving contents in the dc domain using the system in FIG. 4 the following steps may takes place. 1. User dc device requests contents from Akamai dc server. 2. The Akamai dc server requests contents from CNN.com website. At this point the user identity is not known to the CNN site. No cookies for example can be retrieved by the CNN.com site. 3. The Akamai Server requests ads for serving the user from the dc ad server. The dc ad server does not necessarily know the identity of the user by the dc Akamai server. So the user identity may be kept confidential. Instead of specifying the user identity, the ad request from the dc ad server may be requested with certain information relating to the user such as age group, sex, residency area, occupation etc. 4. Contents from CNN.com is sent back to the dc Akamai server; 5. Ads are returned to the dc Akamai server; 6. The dc Akamai server combines the ads with the contents returned and sends it to the user dc device to be presented to the user. We see from these steps that the dc server is the only one that knows who the user is and can control the knowledge of who knows what regarding users. Content providers, the anonymization and identity of users as well as other data and meta data may be controlled in the dc domain to serve on the one hand as better user protection as well as segmenting of knowledge of identities over the Internet.

There is an interesting question which may be raised regarding ads in the dc domain. For example, if the information regarding user action occurs in the dc domain and that information somehow makes it to the ac domain then this poses a potential data leak from the dc domain to the ac domain. For example, a user purchases an embarrassing item in dc domain and receives ads relating to the embarrassing item on ac domain browsing. How about data transferred from the ac domain to the dc domain for helping to choose the best ad for the user? A user may not see it kindly that specific actions in the ac domain have results in the dc domain but the more so regarding actions in the dc domain that may appear in the ac domain.

It is therefore that the ad serving in the dc domain is a more delicate process which requires higher security concerns than are employed today. Ad servers or ad serving applications that have user knowledge should consider the user expected ads in each domain. In one embodiment both domains are completely separated involving two different user accounts. In another embodiment user accounts are updated from ac domain to dc domain zone one way only. In some embodiment it is left to one entity to make the careful decisions regarding user ad content expectancy while ad servers are used without explicit user information but rather information such as interests, demographics and geographic location. As a result we have a system that delivers dc ads to a user without compromising the user security.

Such a system for delivering dc ads may be composed of an ad exchange server to match users to ads. The exchange server automates sale of ads from advertisers and a publisher with contents to place ads on. In some embodiments a dc domain exchange server may be used to select contents in the dc domain for delivering the contents to users in the dc domain. In some embodiments data from an ac domain exchange server may be included into the dc domain exchange server. In some embodiments various information from different sources only originating from the dc domain may be included in the exchange server for deciding on matches between users and ads. In some embodiments advertisers are able to bid on publisher inventory through automated ad-buying tools in the dc domain. Note this is relevant to any content format or ad format, for example images, video, textual, audio etc. In some embodiments the exchange server receives user data from more than one source such as a social networking system, a service provider etc., each of which may be present at the dc domain, ac domain or both. A user in the dc domain is well identified to the communicating party for example, due to the ac/dc adapter and keys used, and therefore user data may be used for sending ads to the user along with the requested content.

In some embodiments the knowledge of the identity of the user making a request for data, such as when requesting a web page, is held at a proxy-like server such as a CDN, for example Akamai. The CDN may then anonymize the user. In such case the user information and characteristics may be held at such CDN server and may be used for ad choosing for the user instead of using the user identity itself. This knowledge may be combined with other data from other sources for selecting the ad to send. An example usage may take place as follows: A user send a URL in dc domain, the dc server receives the requests, constructs the web page and ads, and send the entire web page compiled with all contents and ads in dc domain. Since the CDN or Akamai is already the place to cache ads, it makes sense to place a dc server to directly communicate with the server at such a location. The user may feel better using DC to send a URL and receive the content because only the dc server knows the URL and only the dc server knows which server the web site is returned to. This gives confidence for the user against various hackers and dangers on the internet.

Figure 4B:
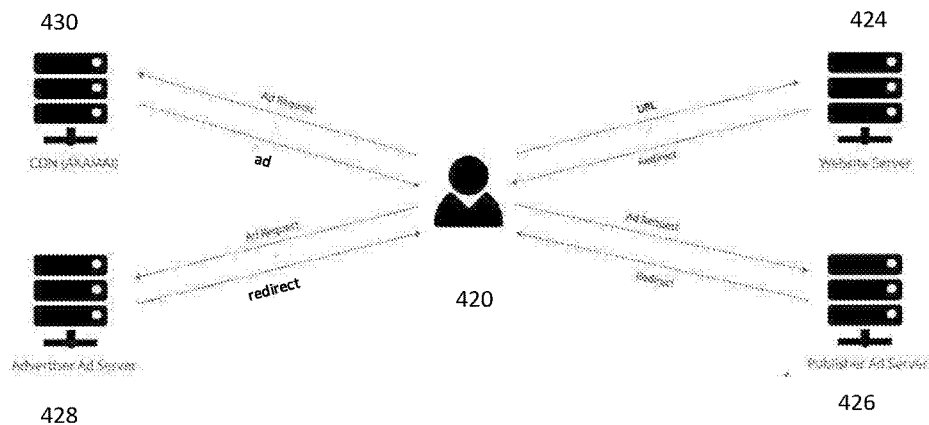
FIG. 4B is a block diagram illustration of serving web content to a user, in accordance with an embodiment of the present invention.

Reference is now made to FIG. 4B, which is a block diagram illustration of serving web content to a user, in accordance with an embodiment of the present invention comprising user 420 who is in the middle of the content fetching map. A content web page may look in simplifying terms something along the line of the following. The user 420 first requests URL from a web server 424, receives some contents with redirects to a publisher ad server 426 which in turn is redirected to advertiser ad server 428 which is then redirected to a CDN such as Akamai 430 for receiving the content which is cached close to the user location. This type of web content fetching is common today and has evolved to this stage historically since the early days of the web, which initially brought the entire content from the URL pointing site. This way of fetching web content includes many attack surfaces. We will see in the next fig. a way to overcome this issue.

Figure 4C:
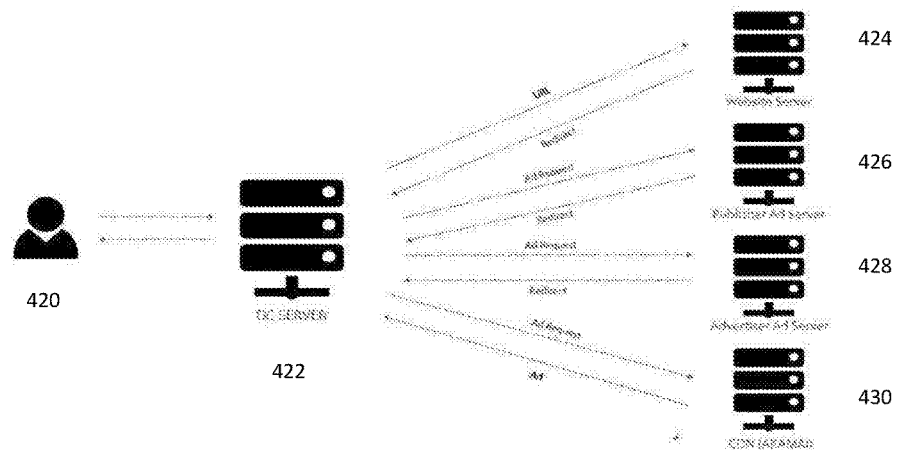
FIG. 4C is a block diagram illustration of serving web content to a user in dc domain, in accordance with an embodiment of the present invention.

Reference is now made to FIG. 4C, which is a block diagram illustration of serving web content to a user in dc domain, in accordance with an embodiment of the present invention comprising user 420 requesting a URL from a dc server 422 in dc domain. The dc server is preferably located in a local CDN location. The dc server 422 makes the fetching for the user as follows: making the usl request from web site server 424, redirected to a publisher ad server 426, redirected to advertiser ad server 428 and finally receives the content from a local CDN such as Akamai 430. The dc server 422 preferably is located at a CDN. The dc server 422 then transfers the web content to the user in dc domain.

The user in this example dc web implementation is communicating in dc domain with the dc server 422, sending the dc server a URL and receiving the web page from the dc server in dc domain preferably to be display at the dc terminal. In this manner the user web browsing within the dc domain hides the user requested URL and returned contents from the ac domain.

There is an interesting point where the web server 424 does not have the user identity but the requesting party is the dc server 422. In a preferred embodiment the various servers apart from the dc server do not know the user identity. The only server with knowledge of the user identity and able to match ads or content to the user is the dc server. The dc server may then send the various ad serving servers information regarding the user identity to match ads for the user. In some embodiments some of the requests of the dc server may be through ac servers.

This is not a preferred embodiment but may be accomplished, in some embodiments with an additional server for passing content such as textual and image back and forth dc and ac domains.

Accordingly, FIG. 4a through 4c display the possibility of serving content and match ads for a user in the dc domain.

Figure 5:
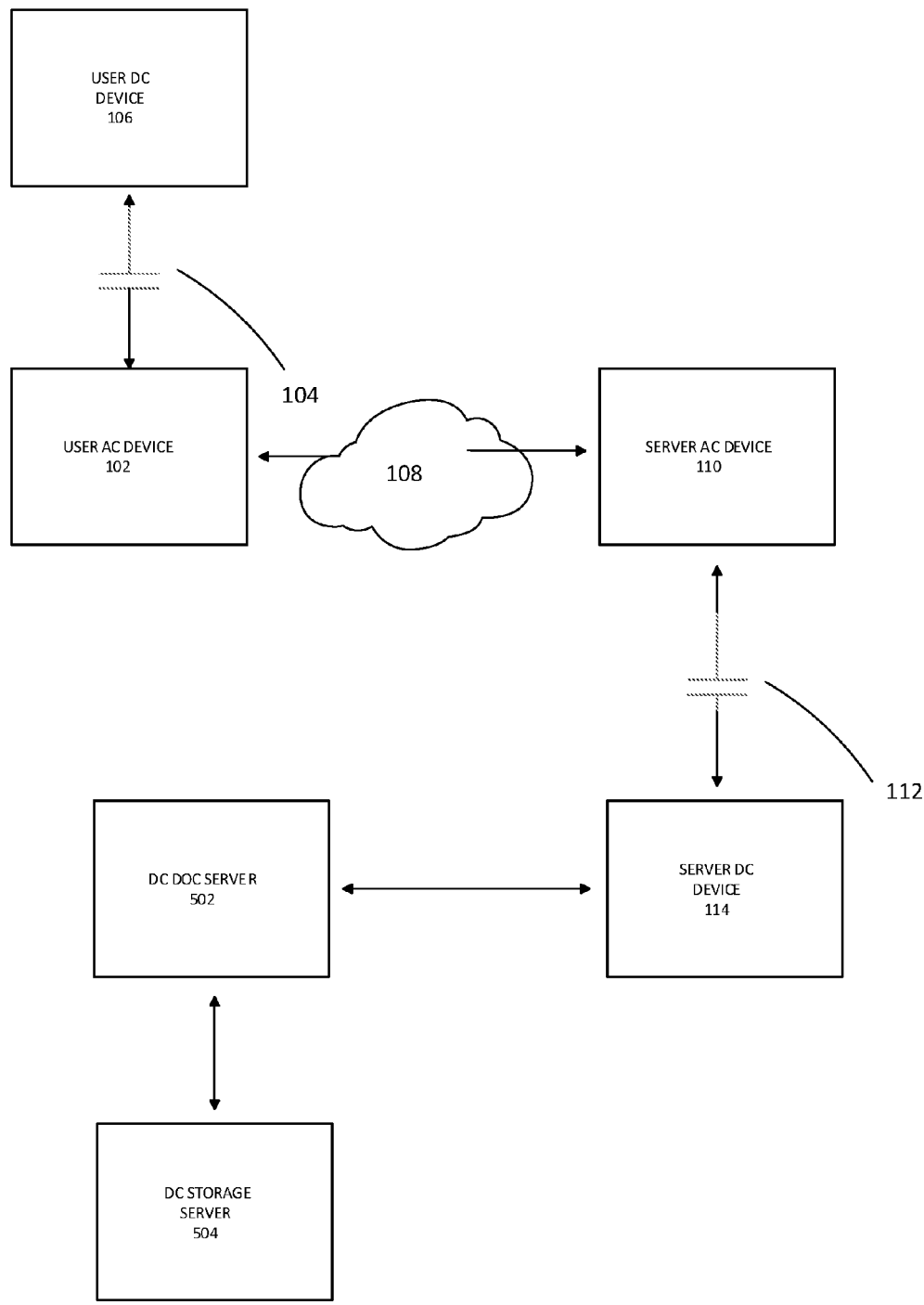
FIG. 5 is a block diagram illustration of a dc document server for dc document handling, in accordance with an embodiment of the present invention.

Reference is now made to FIG. 5, which is a block diagram illustration of a dc document server for dc document handling, in accordance with an embodiment of the present invention comprising similarly to FIG. 1 user ac device 102 connected to a user dc device 106 through disconnection unit 104 or the ac/dc adapter. The user ac device 102 is connected through the network 108 to server ac device 110. The server ac device 110 is connected to server dc device 114 through disconnection unit 112 or ac/dc adapter. Now turning this setup to dc document handling, server dc device 114 is connected to a dc document server 502 which in turn connects to dc storage server 504.

The dc document server serves document functionality to the user in dc domain for functionality such as reading, editing, storing and retrieving documents to the cloud, updating the document to the user, supporting multiple users editing and multiple listeners to document changes etc., all in dc domain. The dc document server 502 is connected to secure storage server 504 for storing the documents in dc.

The server dc framework 116 as discussed in FIG. 1A appears here in the current fig. and includes dc document server 502 for serving document functionality to one or more users as well as optionally includes dc server storage 504. This framework is simplified to present the ability of serving document editing, storing, updating and so forth, in dc to one or multiple users. The implementation of such dc server network may be complicated but is drawn for simplicity here as secure document server 502.

In some embodiments a Google docs or a similar service is used in dc where once every certain time period or dependent upon certain input data from the user, the modified document data may be accumulated, stored in memory or in a file and transferred to the document server in dc which in turn synchronizes the data on the server and updates other users of the update. The updates may include a dc message for each user. In some embodiments a feature that enables such document servers to work offline may be implemented in the present case to support a collaborative online document editing and sharing within the dc domain. In such embodiment the document may not be shared in the ac domain.

Figure 6:
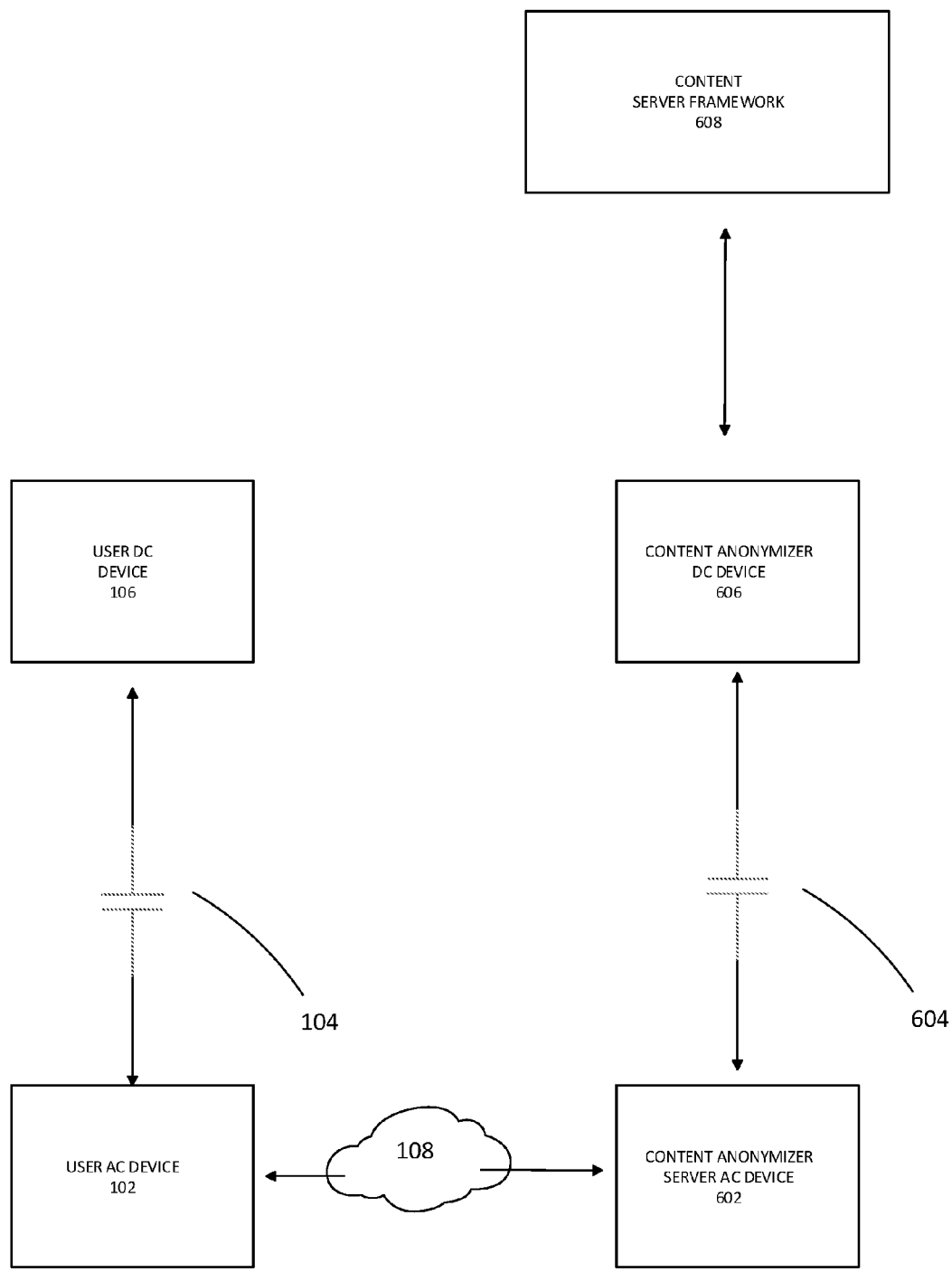
FIG. 6 is a block diagram illustration of a dc device connected to a an anonymizer content dc server, in accordance with an embodiment of the present invention.

Reference is now made to FIG. 6, which is a block diagram illustration of a dc device connected to a an anonymizer content dc server, in accordance with an embodiment of the present invention comprising similarly to FIG. 1 user ac device 102 connected to a user dc device 106 through disconnection unit 104 or the ac/dc adapter. The user ac device 102 is connected through the network 108 to content anonymizer server ac device 602. The content anonymizer server ac device 602 is connected to content anonymizer dc device 606 through disconnection unit 604 or ac/dc adapter. The content anonymizer dc device 606 is connected to content server framework 608 for serving requested anonymized tasks for the user within the dc domain.

In this manner a user within dc domain through using user dc device 106 may request tasks which are in the dc domain and sent in dc to the content anonymizer dc device 606 to carry out tasks and return the results all within the dc domain. Since the actual request and results are in the dc universe, only the request to go to the anonymizer site can be viewed in the ac domain. If many requests are made through such an anonymizer than anonymity can be achieved to the user from various bodies wishing to follow the user.

Figure 7:
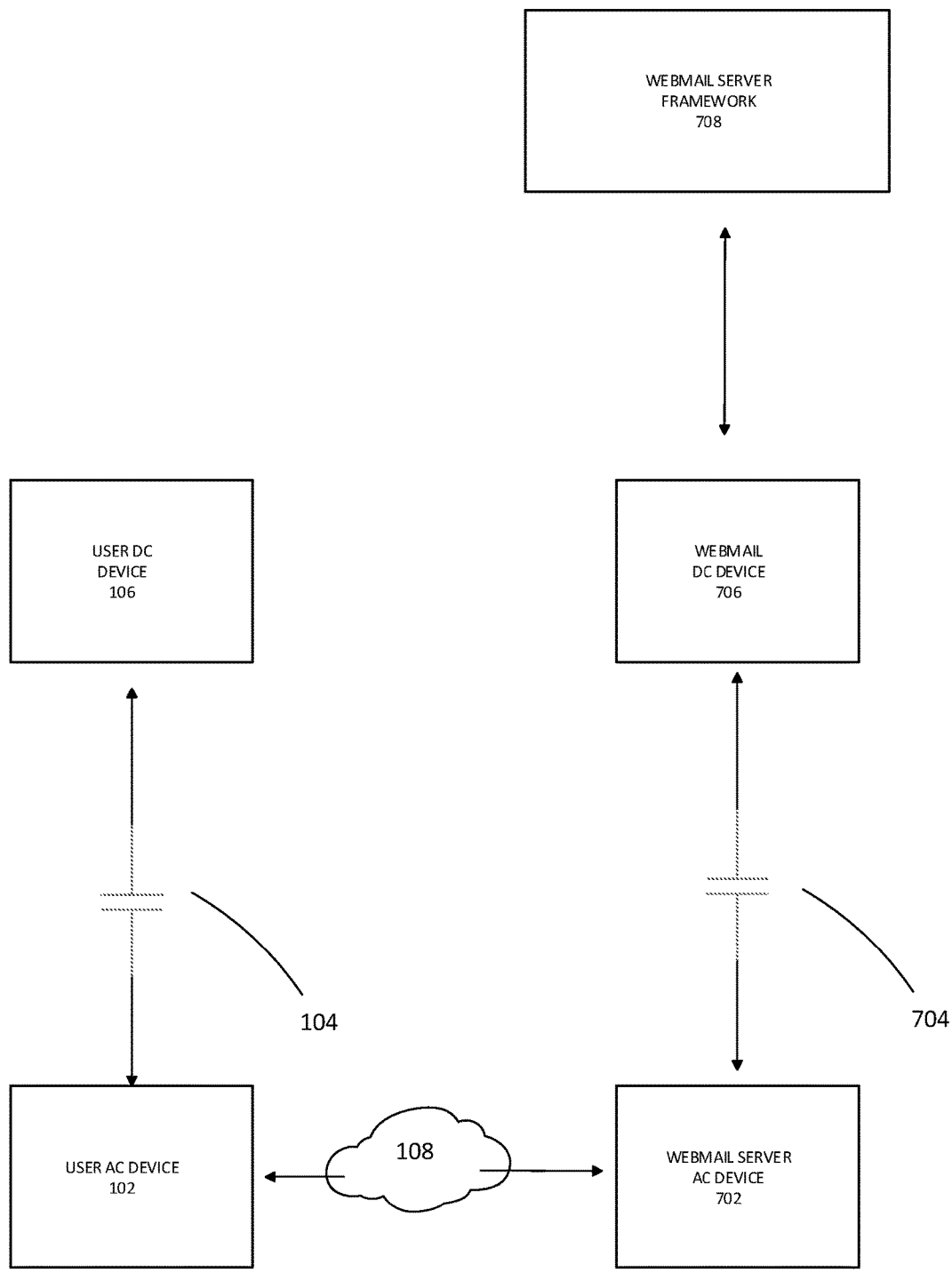
FIG. 7 is a block diagram illustration of a dc device connected to a dc web mail server, in accordance with an embodiment of the present invention.

Reference is now made to FIG. 7, which is a block diagram illustration of a dc device connected to a dc web mail server, in accordance with an embodiment of the present invention comprising similarly to FIG. 1 user ac device 102 connected to a user dc device 106 through disconnection unit 104 or the ac/dc adapter. The user ac device 102 is connected through the network 108 to webmail server ac device 702. Webmail server ac device 702 is connected to webmail dc device 706 through disconnection unit 704 or ac/dc adapter. The webmail dc device 706 is connected to webmail server framework 708 for serving webmail for the user within the dc domain.

The dc server framework as discussed in FIG. 1 is made of the dc webmail server for serving mail to a user in dc, and in some embodiments for serving server mail with ads. This framework of mail and ads is simplified to present the ability of serving dc mail contents originating in the dc domain to a user through the user machine or user ac device. In some embodiments mail is being served not by web but other ways such as mail client.

The use of webmail entirely within the dc domain means in some embodiments that no mail can come from the ac domain. Each email message is authenticated to the originator of the message. No impersonating of another person and using a false originator email address is possible. The idea is that without physical use of the user dc device it would not be possible to send a recipient an email from a sender. Therefore sending spam would vanish or greatly diminished as the originator of spam would not be able to reach an unknown recipient in dc. Keeping in mind the goal of this system is to remove internet attack surface and not to necessarily physical attacks, this use of email reduces phishing and spam if not removing them.

In some embodiments the email, message or other data sent may be unsent upon request of a sender changing their mind following the sending of a message. For example dc message may be sent to the recipient device to undo sending by the user. In some embodiments an email message may be restricted from being forwarded and in some embodiments the email, attachment or data may not be saved by the recipient. The message may only be read by the recipient. In another embodiment the message may be readable or usable for a certain amount of time and then becomes unusable. In another embodiment a message may be sent and received but may become readable or usable at a certain time only. Other embodiments of such usability and restrictions are now possible. Using such a system that has limitations protects the user data and also allows new ways of using the data that are not commonly possible today.

Figure 8:
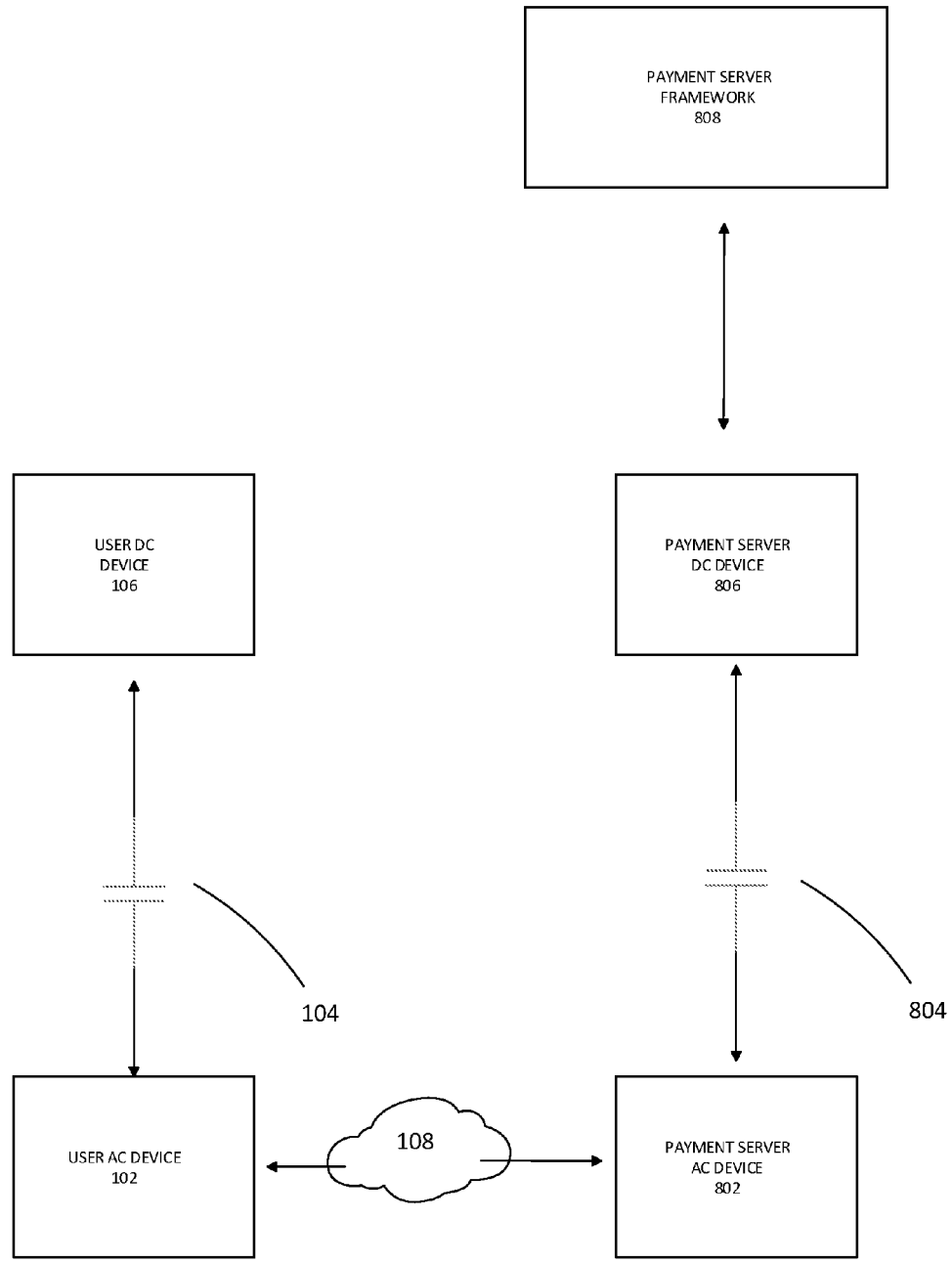
FIG. 8 is a block diagram illustration of a dc device connected to a dc payment server, in accordance with an embodiment of the present invention.

Reference is now made to FIG. 8, which is a block diagram illustration of a dc device connected to a dc payment server, in accordance with an embodiment of the present invention comprising similarly to FIG. 1 user ac device 102 connected to user dc device 106 through disconnection unit 104 or ac/dc adapter. The user ac device 102 is connected through the network 108 to payment server ac device 802. The payment server ac device 802 is connected to payment dc device 806 through disconnection unit 804 or ac/dc adapter.

The payment server dc device 806 is connected to payment server framework 808 for serving dc payment requests for the user within the dc domain.

In this manner a user within the dc domain through user dc device 106 can make dc payments in the dc domain.

The payment server framework as discussed in FIG. 1 is made of the payment dc server for making dc payments for the user. This framework of payments is simplified to present the ability of serving payments originating in the dc domain for a user through the user ac device.

Such a system may offer payment anonymity as well as the removal of internet attack surface.

The straight forward manner in which payments are made with such a system are a major benefit for implementing payment systems. Other systems such as Apple Pay required many years of development both on Apple side as well as in card companies, banks etc. who involved hundreds of people in some of them. This work was required in order to develop an anonymized token system for payments (source, Wikipedia entry for Apple Pay).

In order to implement payment with the dc system in its simples form, a user receives a dc window on their device with the authenticating image, optionally telling them the dc session is with the payment server. Then the user has a message of payment amount to the payment receiver. The user can enter their credit card information and confirm payment.

There is now simplifications which may take place. For instance, a payment dc server in the payment server network 808 may store user credit cards information and the user just receives the same as above only without the need to fill their credit card details, just to press confirm.

In another simplification embodiment the user only presses on a fingerprint button to confirm payment. These examples show the simplicity and straight forwardness in implementing payments within the dc domain where no tokens or any other special approaches are required other than straight forward standard payments such as with credit card numbers. A payment server network may then transfer the payment information to the credit card company or other payment company, preferably in the dc domain of course. The credit card or other payment company handles the transaction as any other normal transaction.

Having the payment done in the dc domain saves the Burdon of needing additional anonymization protocols between different parties and makes payments a straight forward simple process, in any dc device which may be a mobile phone, a tablet, a pc, a laptop, s smart watch, a vehicle etc.

In a day to day embodiment consider a user wanting to pay for their train ride with their mobile phone. The user flashes their phone next to the train payment stall. The user receives a dc window just like mentioned above along with the authenticating image and optionally a message saying the session is with the dc payment server or in an embodiment, with the dc payment server of the train company or in another embodiment, the actual terminal the user is buying the ticket from.

For the transaction to take place, the user communicates with the dc server which will be called here payment server dc device 806. The train payment stall also communicates with the payment server dc device 806. Both the user dc device and the train payment stall don't know each other to communicate in the dc domain in some embodiments.

Figure 12:
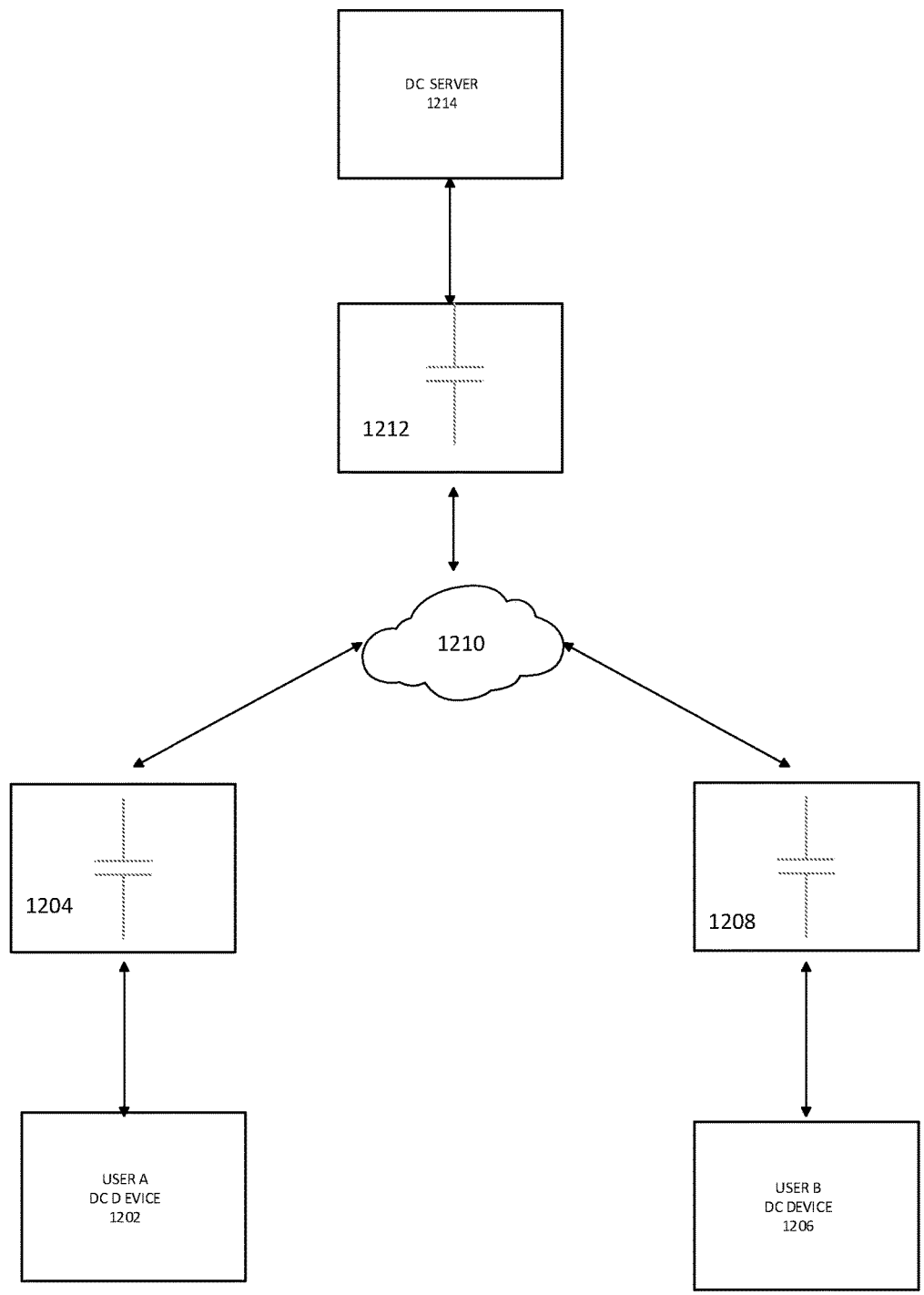
FIG. 12 is a block diagram illustration of a dc server for allowing communication between two dc devices with no attack surface, in accordance with an embodiment.

In an example embodiment a random number is created in the ac domain and communicated over NFC. Using this random number both user device and train payment stall device send a dc message such as described in FIG. 15. The random number may appear in the clear number of the dc message. The payment dc server knows both devices and is the connecting place. FIG. 12 discusses meeting place between users but is also expandable for meeting between devices and users and devices in general. In some embodiments the connection between user device and payment stall takes place in the dc domain.

When both the user request to pay and the train payment stall requests payment and the user authenticates the payment, the payment dc server goes ahead and authorizes to make the payment. In this way the payment stall does not know the identity of the user or their payment info.

The actual payment is done in the payment server framework 808. The messaging between payment server dc device 806 and payment server framework 808 may be over the internet through an ac device, and not in dc as in FIG. 8 which was drawn this way for simplicity. The payment server framework takes care of the payment process for the user. For example, the payment server framework may have the user credit card or debit card information stored. The payment server framework then sends the payment details to the card company or bank as is customary in these situations and completes the transaction. Communication of the payment server framework with the card company and/or bank is preferably done in the dc domain. This way it becomes straight forward and simple to implement payments with any device using the dc domain.

The benefits in addition to the simplicity of implementation and removal of attack surface from the ac domain is that the merchant is not exposed to the user payment details, since the payment information may be stored on the payment servers. Furthermore, it is possible not to store the card information on the payment server framework either. In case of agreements with a card company, say Visa, a user upon initializing the dc payment service adds a Visa credit card. The card is verified with the Visa dc payment server and once authenticated, the Visa server associates the user dc payment request with that card, for example by saving the last 4 digits of the card. Then when payment takes place, the payment server framework contacts visa with the specific user number or id requesting purchase without the credit card details. Only in Visa servers is the association between user and card information takes place and the payment takes place. This is a further example of the advantages of the dc domain that removes attack surface and allows user authenticated requests to be sent to their final destination, such as Visa, instead of forming artificial tokens to solve problems that occur in the ac domain.

FIG. 8 displays the use of payments and their straight forward approach in the dc domain making the dc domain ideal for making payments using user devices for protecting user identity and user payment card information.

In regards to handling files in the dc domain. In some embodiment a server framework for storing dc files on a cloud is set up in order for a user to store dc files for using these dc files on the cloud as well as for backing up dc files in case of loss or malfunction of user dc device. In such a case, a user may purchase a new dc device and recover their dc files on the cloud following the authenticating of the new dc device to the dc server with the user identity.

Figure 9:
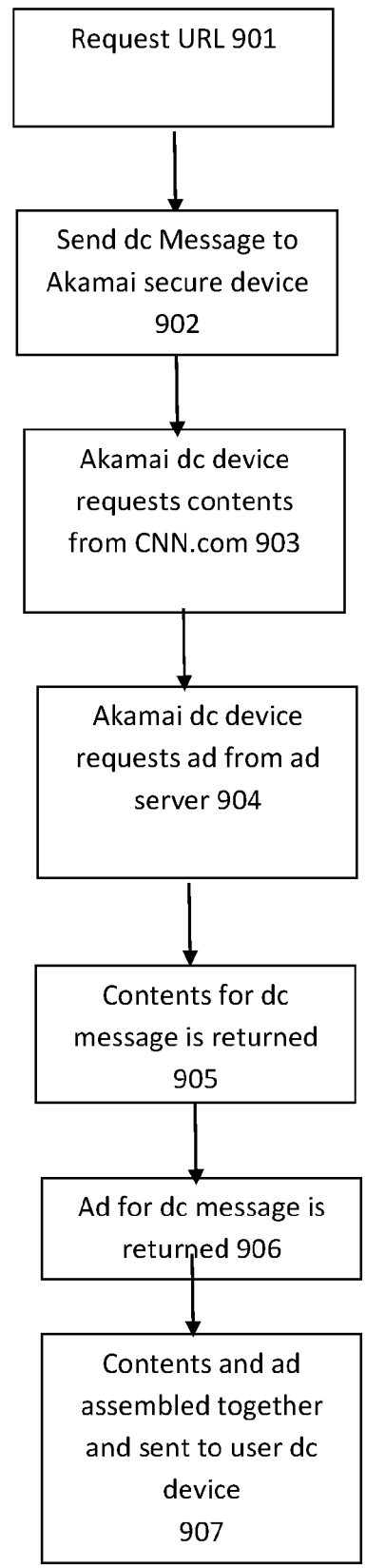
FIG. 9 is a schematic flowchart for the steps carried out for receiving contents in dc domain, in accordance with an embodiment of the present invention.

Reference is now made to FIG. 9, which is a schematic flowchart for the steps carried out for receiving contents in dc domain, in accordance with an embodiment of the present invention.

In step 901 a user requests a URL, for example, CNN.com. The URL request is packed into a dc message. A dc message is discussed in FIG. 15. The public part of the dc message may be addressed to a CDN server such as an Akamai server.

In step 902 the dc message request is sent to an Akamai dc device through the Akamai ac server to serve the user request. The user knows the server is not a spoofed server that may maliciously interact with the user because the dc message is only usable by the Akamai server in the dc domain. Likewise the Akamai server knows the identity of the sender of the request because of the dc message properties of authenticated sender and recipient. The Akamai secure device opens the URL request of the user, CNN.com.

In step 903 the Akamai server requests the URL CNN.com from the CNN servers. In a preferred embodiment the CNN server has a dc server from which the Akamai server requests the contents. The contents from CNN.com or some of it can already be cached in the Akamai server. In a preferred embodiment the request to the CNN.com is made without the identity information of the requesting user, hence breaking the tie between content provider and requesting user. This may help anonymize the user as well as protect the user from being tracked. This prevents finding the physical location of the user and may also allow the user to access sites that are blocked in the user origin.

In step 904 the Akamai secure device requests ads from an ad server. In a preferred embodiment the ad server has a dc server from which the Akamai server requests ads. Ad contents or part of it can already be cached in the Akamai server. In a preferred embodiment the request to the ad server is made without the identity information of the requesting user, hence breaking the tie between content provider and the requesting user. This may help anonymize the user as well as protect the user from being tracked. The Akamai server may send data to the ad server such as the site being requested and some general information about the requesting user such as age group, sex, origin etc.

In step 905 the contents for the dc message is returned from the CNN site.

In step 906 the ad for the dc message request is returned from the ad server.

In step 907 contents and ads are assembled together and sent to user dc device. The page can now be rendered on the user dc device and displayed to the user such as on their dc terminal as described in the initial applications without going through the ac domain.

In this way it is shown on very simple and rough guidelines how browsing the web may be accomplished securely protecting the user from phishing scams such as URL misspelling, or compromised websites. The user anonymously receives the data from the requested server and ad server so the user cannot be tracked by the content providers. User physical location is protected as well and blocked sites may be accessed. Since the Akamai servers are being used anyway for the actual content delivery to the user, this approaches scales well while offering the user the dc features that do not exist today while keeping the content and ad players in place. User separation from ac domain is kept by the fact that the URL requested and data received only exists in the dc domain and not in the ac domain. This is true for all devices in the route which are in dc domain. So that for example key loggers, screen captures and other malware on the user ac device cannot detect the data entered, sent and received, as explained in the initial applications. The same goes for information entered into web pages or documents in the dc domain.

Figure 10:
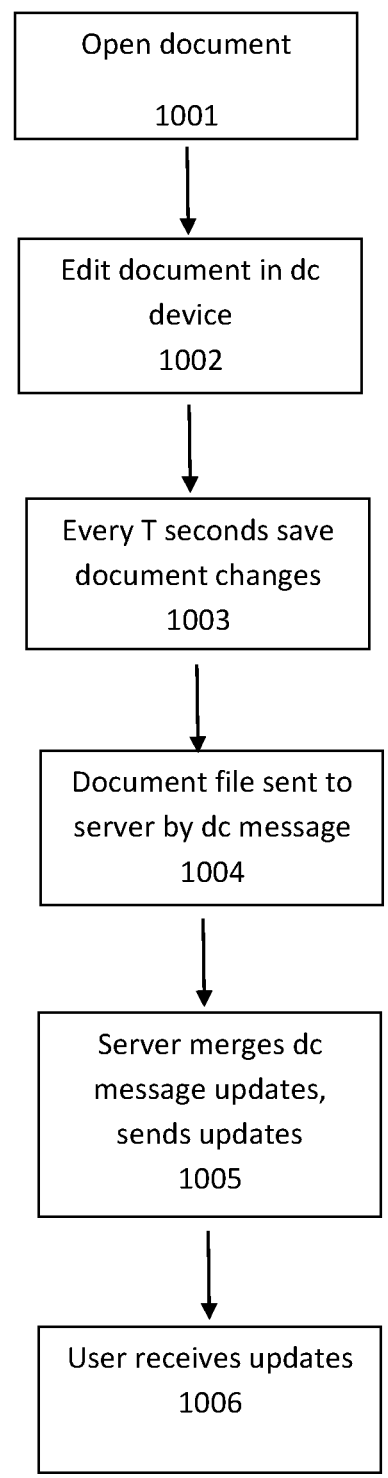
FIG. 10 is a schematic flowchart for steps carried out for editing a document through a document server in the dc domain, in accordance with an embodiment of the present invention.

Reference is now made to FIG. 10, which is a schematic flowchart for steps carried out for editing a document through a document server in the dc domain, in accordance with an embodiment of the present invention.

In step 1001 a user requests to open a document. The document is opened in the dc domain. The user dc device runs a program that opens the document. For example, a Google docs document is open by the dc device similar to how a google document is opened as an offline file in the ac device. Data from the dc server, such as an offline file, is received in the dc domain such as with a dc message. Dc messages are discussed in FIG. 15.

In step 1002 the user edits the document in the dc domain. This takes place such as with the user dc device using the dc terminal.

In step 1003 every T seconds the changes made to the document are saved. As in the case of Google docs for example, the insertion of each character and its location in the document, such as the character number, is registered and this information is being saved. This routine may be viewed as a Google docs being edited offline.

In step 1004 document changes are stored into a dc message and sent to the document dc server.

In step 1005 the server merges the dc message updates and then sends updates if necessary to all users working or listening on that document. The updates are sent using dc messages. This step may be viewed as an offline document being connected again.

In step 1006 the user receives the updates with a dc message from the dc server and the user dc device updates the document accordingly.

In this manner it is shown how a document may be edited and used by multiple users in the dc domain. This method provides separation from ac domain and anonymity to the users of the system and protects the document contents from those who are not authorized to read it. In some embodiments the document can be blocked from sending onwards so that a document may be further controlled. The example of an offline Google docs is made here for explanation purpose as well as for practical purposes, although other usages may be made possible.

Figure 11A:
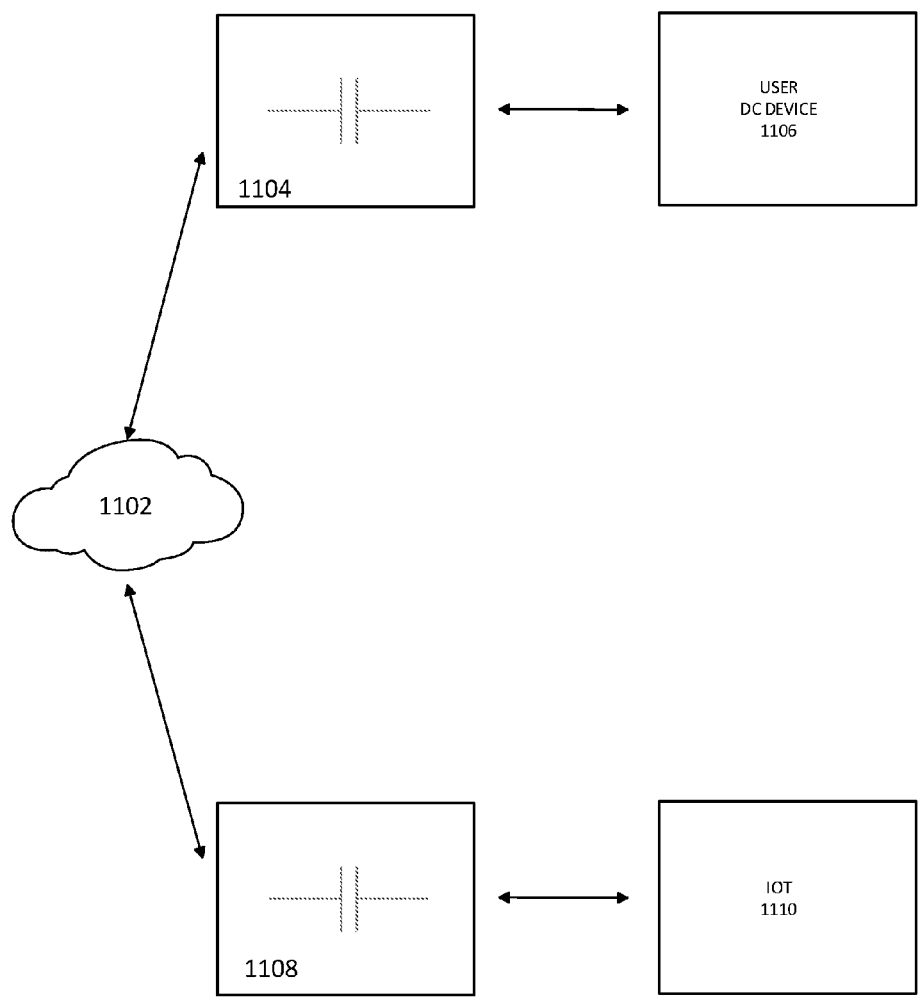
FIG. 11A is a block diagram illustration of a IoT device connected to a user dc device through a disconnection device over the network, in accordance with an embodiment.

Reference is now made to FIG. 11A, which is a block diagram illustration of a IoT device connected to a user dc device through a disconnection device over the network, in accordance with an embodiment of the present invention comprising user dc device 1106 in the dc domain connected through a combined disconnection device and a network connected device 1104 which we will refer to as a combined disconnection device 1104. The combined disconnection device 1104 is connected to the network 1102. The combined disconnection device may be composed of an ac device and an ac/dc adapter. The intention is to make the drawing simpler but such a device may be made as well.

The illustration is further comprising an IOT 1110 which is an internet of things device that may have many different embodiments from controlling lights to a video camera. The IOT 1110 is connected to a combined disconnection device 1108 which is connected to the network. The user can now communicate to the IOT in the dc domain.

Figure 11B:
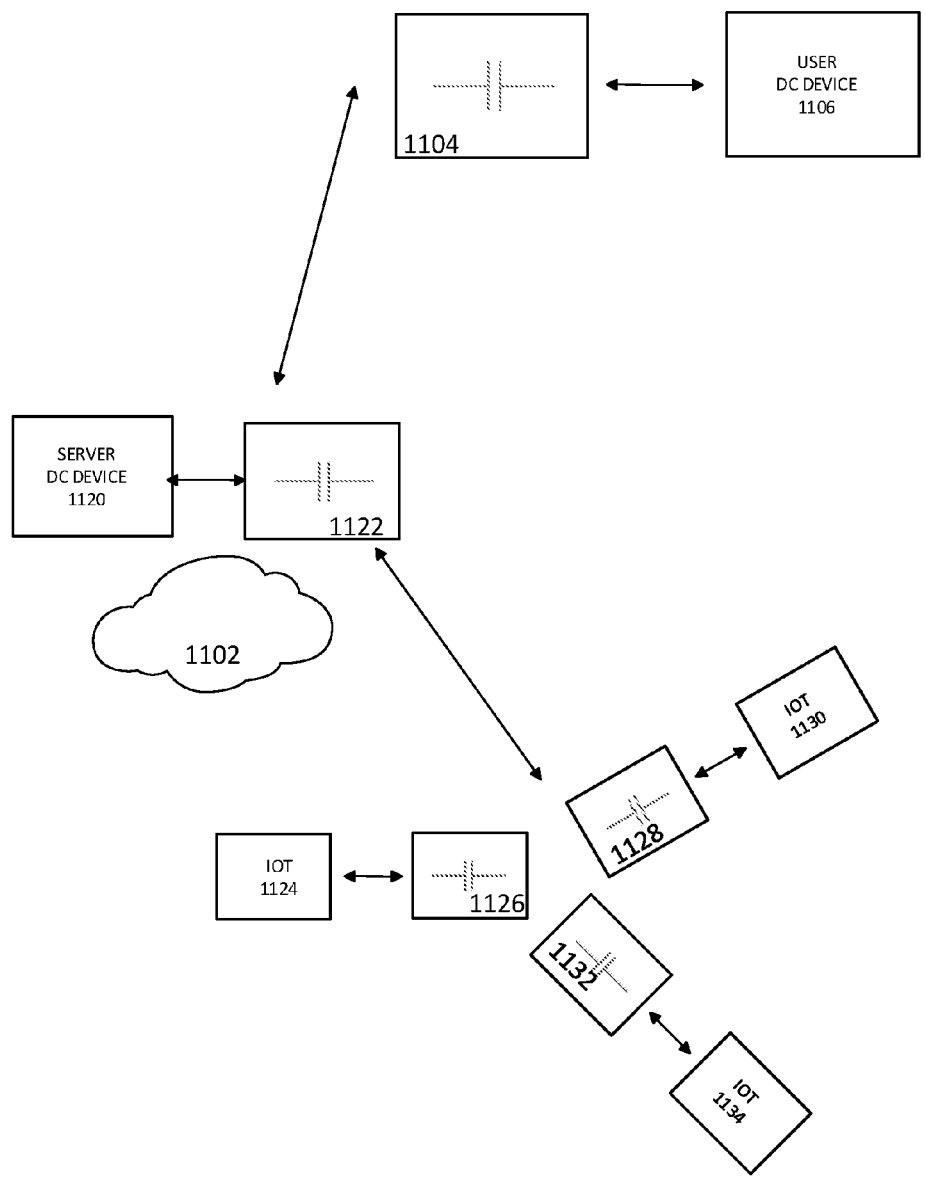
FIG. 11B is a block diagram illustration of dc IoT devices connected to a user dc device through a dc TOT server, in accordance with an embodiment of the present invention.

Reference is now made to FIG. 11B, which is a block diagram illustration of dc IoT devices connected to a user dc device through a dc IOT server, in accordance with an embodiment of the present invention comprising three IOT devices 1124, 1130, 1134. Each IOT device is connected to a combined disconnection device 1126, 1128, 1132 respectively. Each of the combined disconnection devices may communicate directly with each other in dc domain so that in case the internet connection fails these devices may still connect with each other.

The combined disconnection devices may connect with a IOT server dc device 1120 through a combined disconnection device 1122 that are located over the internet. The user dc device 1106 connected through a combined disconnection device 1104 may connected through the internet to the IOT server dc device 1120 through the internet through combined disconnection device 1122.

This way IOT devices may connect among themselves directly in the dc domain as well as connect to the IOT dc server in the dc domain. The user may also connect with the IOT dc server in the dc domain with their dc device. In this way the entire IOT may be in the dc domain.

The way a setup such as this is made is as follows. A user registers their dc device with the IOT dc server. Then the user purchases IOT devices, Each IOT device is registered by the user using their dc device connected to the IOT dc server. This may be done by for example, having the user type a serial number on the IOT device. The server which has knowledge of the IOT devices sold may then assign the IOT device into the user account. The IOT device may then share a special key sent by the IOT server to each of the user IOT devices so they may communicate directly in the dc domain in a case when the internet fails.

In a preferred embodiments the IoT is initiated to communicate with an IOT server in the dc universe. The user may connect to the dc IOT server using the user dc device and request to add the device to their account. This may be taking place by a serial number printed on the device for example. Following adding of the device to the user account the IOT server may allow the user dc device to communicate with the IOT device. An example of such a step is explained in FIG. 12 where the meeting server may allow the user to communicate securely with an IOT device.

In another embodiment a dc IoT device may be configured to communicate with another IoT device or another dc device by a specific direct physical connection. This may allow exchange of keys for continued communication in the dc domain when the devices are no longer physically connected.

The FIG. 11 demonstrates how IOT may work in the dc domain with no internet attack surface. These fig. also shows that in some embodiments the user device which is assumed to be an ac device may actually become the dc device itself. The combined disconnection device does the ac domain communication and allows the dc device to be the user device in dc.

Similar to IoT, medical devices may also be placed in the dc domain as they may be similar in communication requirements like IoT devices. Medical devices are sensitive devices when it comes to security both for patient privacy as well as for patience safety. Communications with a medical devices for data and even for updates and maintenance should take place in the dc domain with a trusted host or hosts communicating entirely in the dc domain safe from eavesdropping or from various malware. Medical devices may communicate between themselves in the dc domain to increase privacy, safety and prevent hacking.

Similar to IoT are transportation vehicles such as automobiles. Systems in cars such as smart vehicles communicate and are vulnerable to various attacks. The various systems in the car may all communicate in the dc domain with each other as well as communicate with the passengers and network in the dc domain. The car may also communicate with the garage or car maker for some issues, which will take place in the dc domain. The vehicle may also communicate with various content providers in the dc domain.

There are many other examples of devices that require communication with a user as well as with other systems. Using the dc domain may be a solution to the concerns such as privacy, security and takedowns. Such examples are planes, ships, various types of cargo etc.

Reference is now made to FIG. 12, which is a block diagram illustration of a dc server for allowing communication between two dc devices with no attack surface, in accordance with an embodiment of the present invention comprising user A dc device 1202 connected to a combined disconnection device 1204 that connects to the network 1210 and user B dc device 1206 connected to a combined disconnection device 1208 that connects to the network 1210. The fig. further comprising dc server 1214 connected to combined disconnection device 1212 that is connected to the network 1210.

The combined disconnection device is as described in FIG. 11 description as a disconnection device and a computing device connected to the network. The dc server 1214 sets up communication between two users A and B that would like to communicate securely in the dc domain.

Both user A and user B can communicate in dc domain with the dc server. In a preferred embodiments the user dc device is initialized with this capability where the user dc device is manufactured to communicate with the dc server such as by copying the dc device key into the dc server. This way the dc device key does not travel in any protocol in the ac domain. The key at the dc server may be stored similarly to how it is contained in the user ac/dc adapter or in a similar device to protect the key.

A communication between user A and B in the dc domain may take place as follows. User A composes a document in the dc domain using a dc application. User A sends the document to the dc server indicating user B as recipient, such as using user B email address. Note the user B email address may be included by user A in the dc domain. The dc server 1214 decrypts the document from user A using user A key stored in the dc server. The dc server looks up the user B key using user B email address supplied by user A. The dc server then encrypts the document with user B key stored in the dc server. The dc server then sends the document to user B, such as using user B email address. User B then opens the document using their dc device and dc terminal. This way user A can send user B a message in the dc domain with no internet attack surface.

In such a communication method between user A and user B in the dc domain there is no need to install any software, share keys, implement protocols etc. The communication in the dc domain takes place with none of these and is taking place in a straight forward and seamless manner so that attack surface is removed. The initialization of the ac/dc adapter with the dc server and the keeping of the dc domain separate from the ac domain allows us to implement a simple communication between two or more parties over the network with no network attack surface.

Another way for communicating between user A and user B in the dc domain is as follows. User A contacts the dc server in the dc domain requesting to add user B as a party for dc communication. This may take place in different ways such as indicating user B email address in dc or choosing between dc domain users associated with user A. User B which can also communicate with the dc server acknowledges the request. In an embodiment dc server creates a random symmetric encryption key and send the key to both user A and user B in the dc domain. This may take place by sending of a dc message to each user with the key. User A receives the communication key and stores it in the dc domain for communicating with user B while user B receives a dc message and stores the key in the dc domain for communicating with user A. Please note communication may use randomly generated keys and only handshakes user the original manufactured key.

Now when user A wants to communicate with user B user A prepares a dc message using the communication key. User B can contact user A in the dc domain using the same key. For each two devices wanting to communicate there may be a different key so that a dc message intended for one device cannot be used by another device. The dc device stores the communication keys in the dc domain. Note that storing in the dc domain may be storing an encrypted dc file in the ac domain, such as saving an encrypted file in the user machine drive which is the ac device drive.

The connection process between A and B may be confirmed by both parties and may be authenticated to each user through identifiers of the other party such as an image and description as well as other means of authentication such as social networks, organization means and so forth. User A contacts the dc server in dc domain requesting to add user B as a party for dc communication. User B confirms user A request to connect. In some embodiments A and B connect through direct physical connection exclusively. This way random key is shared directly instead of over the network.

The figures and explanations brought here include the terms dc messages, disconnection devices, combined disconnection devices but these are brought for explaining a single embodiments while other embodiments may exist including more ways and different ways to communicate and accomplish the goals of a dc domain. The exclusivity of the dc domain where only those in the dc domain can use dc domain data and messages is important to understand the difference between ac "secure" devices that are very well protected by themselves but either their data can be used in network connected environments, or they can be on the network connected environments and so forth.

The user may make use of dc data through the mechanism of a disconnection device and a dc device that is connected to a dc terminal or video combiner and where keyboard input mouse/input/touch event input first goes into the dc device and then travels to the ac device. Keyboard input/mouse input/touch event input may also be switched between dc device and ac device under the control of the dc device or ac/dc adapter.

Figure 13:
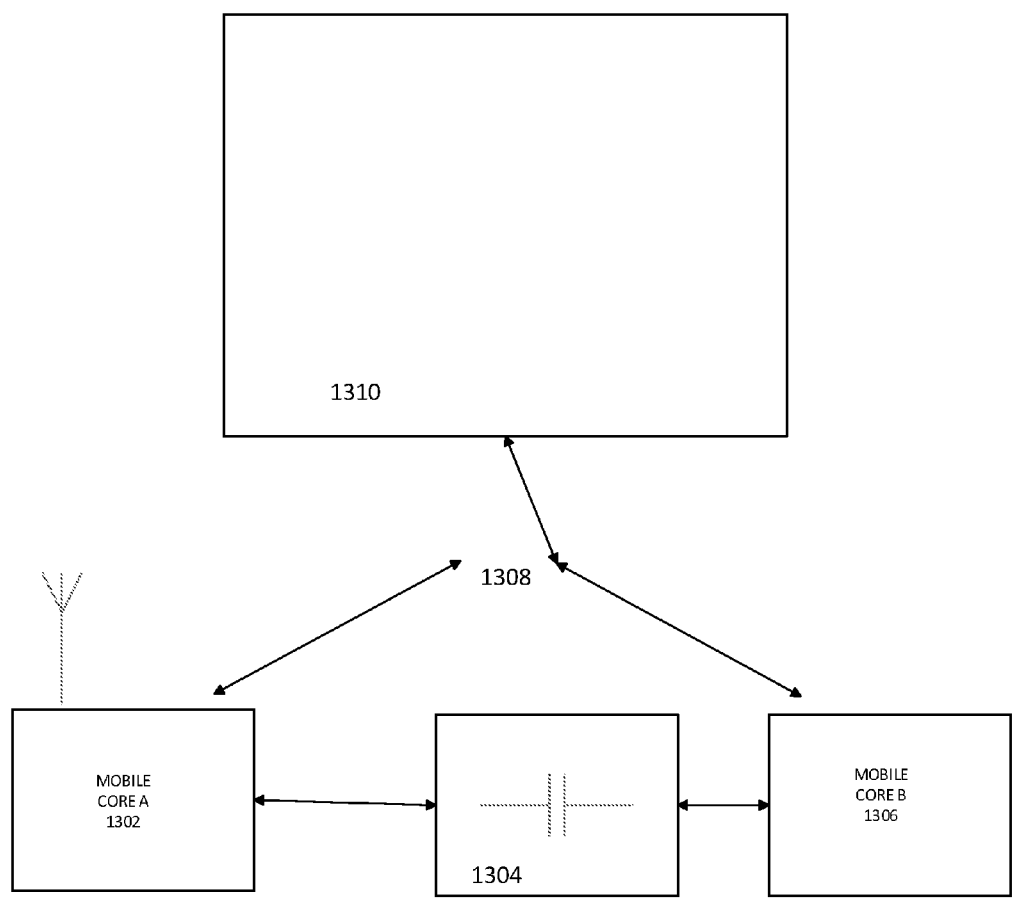
FIG. 13 is a block diagram illustration of a mobile device configured for working in the dc domain, in accordance with an embodiment of the present invention.

In essence, the dc data must not pass in the ac domain. Other embodiments may exist for achieving this goal such as a mobile device with two computing devices, one a ac device and the other a dc device connected through a disconnection device to the ac device. This is shown in FIG. 13.

In some of FIG. 12 embodiments, we actually have key sharing mechanism through a trusted entity and without a public key infrastructure. Key sharing may be implemented using PKI indeed. Although in some embodiments it is preferable not to use PKI for several reasons such as bad implementation of PKI, not trusting the public key such as MITM (man in the middle) attacks or certificate authority data breach, and even due to questioning of the theoretical difficulty of factoring in light of polynomial solution claims to graph isomorphism. In this disclosure there is presented a way for user of device A to use the dc domain with any other trusted dc device C, in order to share a symmetric key and start communicating with another device B in the dc domain. This can be viewed as a friend I trust vouching for another friend to me. In some embodiments physical access may be required for accepting a friend for communicating in the dc domain. This is in particular when there is no one vouching for that friend. As is explained in the initial applications, it may not possible to achieve a connection with the device in a cyber only method without physical access. In some embodiments we are most concerned about cyber-attacks rather than physical attacks.

In a preferred embodiment each communicating pair/group of hosts use a different key for communicating. The keys which may change in some embodiments from time to time and even during the communication.

In some embodiments there may be keys for a group to communicate. Rights such as document to read/modify/send onwards may depend on being a part of a certain group.

The dc device is initialized in a preferred embodiment upon user first receiving it, with an initial trusted server to be working with. For example, in a corporate network a dc device may be initialized with the dc server 1214 within the corporation. In the outside world, the dc device may be initialized to communicate in dc with a dc server 1214 of a provider such as Google. If now for example I would like to connect with a friend in dc, this may be done through the dc server, using an initial email for example or by other means. This way a MITM (man in the middle) attack on the dc domain will not work as the dc device will not talk with any server it is not configured to talk to. In some embodiments no keys are sent over the air for communicating with any new server. This makes sure no server other than physically initialized dc servers may communicate with a dc device.

The keys chosen for the communication between two users A and B may be replaced at various times, for example during a transfer of a dc message. A dc message is sent from the dc device and layer 2 such as ac/dc adapter may decide to change the keys. The new key is generated and sent along with the dc message. When the session ends and communication is acknowledged the key may be changed for future sessions. Each side may initiate a key change at any time.

In some embodiments, messages may be passed between devices through a dc server using each of the device keys that were initialized with the dc server. In such set up as well as with key sharing as above, the trust model such as certificate authority is not needed and no middle man is necessary to obtain secure end to end communication. In such an embodiment there may be a single body between the endpoints which is the manufacturer of the dc devices, which offers dc communication with no trust model, middle man, or any attack surface available from the network and its connected devices.

FIG. 12 shows how communication between two or more users takes place in the dc domain.

Reference is now made to FIG. 13, which is a block diagram illustration of a mobile device configured for working in the dc domain, in accordance with an embodiment of the present invention comprising mobile core A 1302 which is a mobile core capable of many tasks such as connecting to the network and has an antenna. Core A is connected to mobile core B 1306 through disconnection unit 1304. Core B communicates through core A and sends it dc messages through disconnection device 1304. The screen 1310 is switchable between the two cores through switch 1308 controllable by core B dc device.

When the user uses the mobile device through core A and wishes to use a dc application then core B receives a command from core A. Core B switches the screen switch 1308 to connect directly to the screen for displaying and receiving input data such as touch screen input. The communication takes place by core B forming dc messages and sending them as well as receiving dc messages through core A.

The illustrated mechanism is a simple one made for easily explaining the concept of dc domain with a dc device and there may be many other embodiments to achieve such a goal. One such example is using a screen combiner as explained in the original applications and in FIG. 1D. Another is to use a screen combiner that will allow any area of any shape to be switched to another universe on the screen. Such combiner may allow multiple shapes to be placed on the screen simultaneously.

As explained in FIG. 12 a dc server can be used to communicate between devices. In addition to that in some embodiments a direct physical connection between two dc devices may allow for a dc data exchange between the two devices. This can be useful for example in an enterprise where the communication policy may be that communicating in dc is only possible after you have personally met each of your contacts and verified them.

It can be seen from the presented illustrations that the dc domain is capable of preventing phishing, spam unsolicited mail, malware, APT groups reaching your data, malware encrypting your data for ransom etc. The dc domain may finally eliminate passwords that are used for example, to log on to sites. That is because the dc communication authenticates the user with their dc device. The importance of the authenticating image to the user in the initial applications is also an important step in accomplishing authentication. This way the dc device authenticates to the user so the user knows the dc domain is active. Then the dc device authenticates to the dc server to make an authentication from the user and to the dc server. The authenticating image helps the user knowing the request for information or displaying information, such as requesting password or password change is a dc device and not a social engineering attempt for example.

Figure 14:
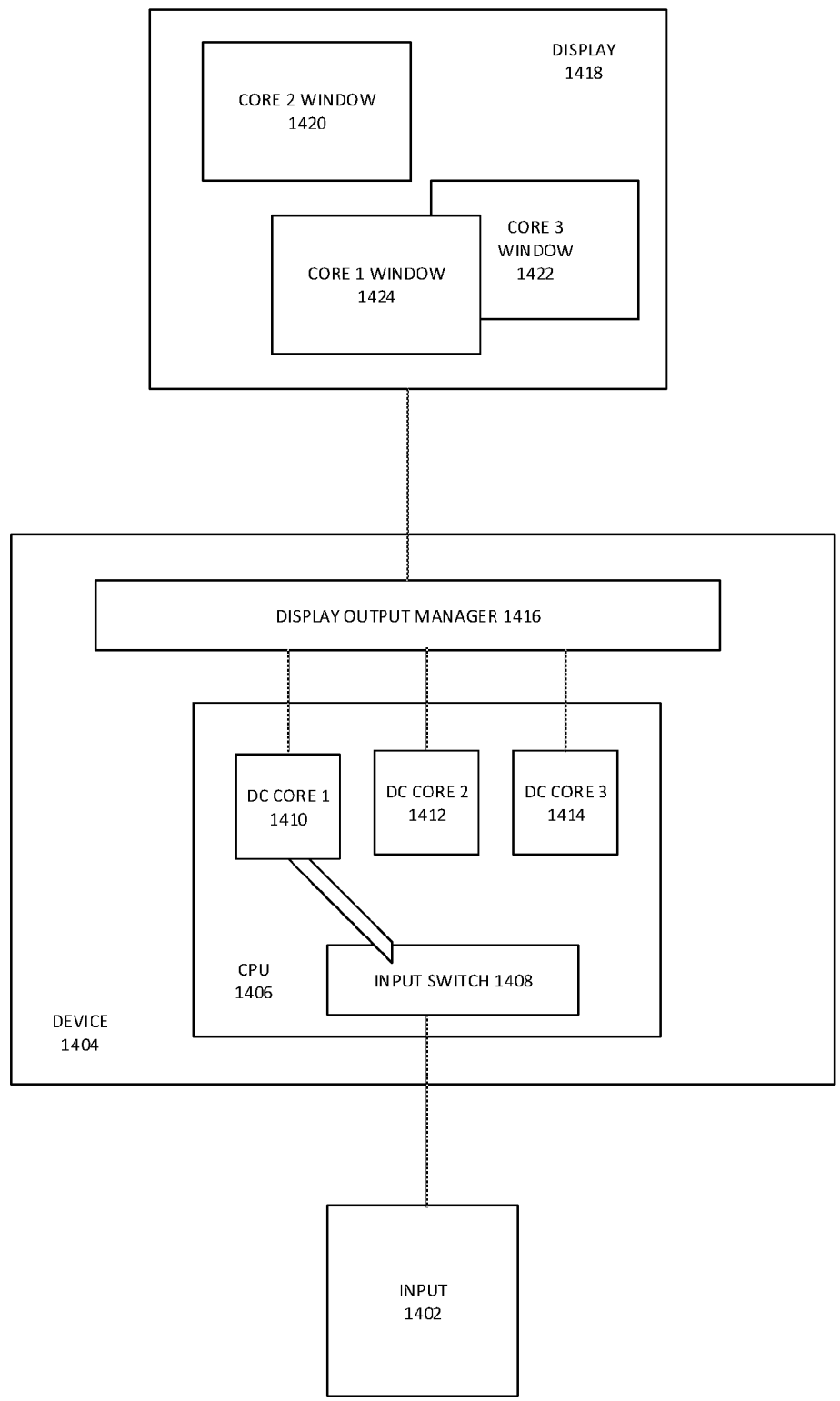
FIG. 14 is a block diagram illustration of a multi dc device, in accordance with an embodiment of the present invention.

Reference is now made to FIG. 14, which is a block diagram illustration of a multi dc device, in accordance with an embodiment of the present invention comprising input 1402 for user input for example, connected to device 1404 which is connected to display 1418.

Device 1404 is composed of a CPU 1406 which includes multiple dc cores, in the illustration the CPU has 3 cores, dc core 1 1410, dc core 2 1412, dc core 3 1414. An input switch 1406 within the CPU 1406 receives input from input 1402 and switches the input to one of the dc cores.

Each of the dc cores is connected to a display output manager 1416 which manages the display for each of the dc cores on the display 1418 such that dc core 1 1410 is displayed on the display 1418 on core 1 window 1424. Dc core 2 1412 is displayed on the display 1418 on core 2 window 1420. Dc core 3 1414 is displayed on the display 1418 on core 3 window 1422.

In a computing device where it is of importance to separate between applications and their removal of attack surface from the network, such a device may offer the user a user experience similar to common devices we have today that are in their entirety in the ac domain.

The operation may operate as follows. When the user works with a certain window on display 1418, for example, using window 1422 belonging to core3, the management of the device focuses on window 1422 with a mechanism not shown in the fig. but is a standard windowing mechanism which may be in ac or in dc depending on implementation and embodiment. This causes switch 1408 to direct input 1402 to dc core 3 1414. Then input is isolated from other dc core or ac. The output to display 1418 within core 3 window 1422 is shown to the device user but not visible from ac device or other dc cores.

The display output manager 1416 receives display data from each dc core and possible ac and directly places them to the display without each dc display data passing through any other dc core or the ac device if any. This may be done in some embodiments by an indication of which pixel to take from each display input received by the display output manager 1416 through management in device 1404 so that actual display information does not pass through the device other than that dc core. This way each dc core is independent and separate from others.

Some of the expected behavior and functionality in the multi dc device context may include copy and paste functionality. A copy command takes textual or image data and protects that data with the dc key. A paste command receives the protected data from another dc core or the same dc core. If permission is sufficient to pass the data within dc then the data is decrypted and usable in the destination where the data was pasted to. Otherwise paste will fail.

While today the one of the importance for CPUs is in the multi core capability, it may be that it will also be important to have multi dc core for removing attack surface between running applications in dc domain, where multiple applications execute in the dc domain on a single device where each application is with no network and internet attack surface and no attack surface from other applications in dc. In such a scenario CPUs with multi dc cores are made, display output mechanism that displays the different dc cores without a dc core display accessible from other dc core. A display for such a setup may be made as well as a management for such a display.

In some embodiments for certain dc core implementation within the CPU more than one core may be assigned to a dc core. In another embodiment a CPU core may be assigned dynamically to a logical dc core.

FIG. 14 shows the possibility of the support of hardware for supporting the execution of multiple dc applications running simultaneously on a single device. It may be possible to support such CPU, for example, with a network card such that only dc messages pass through; a router for only passing dc messages and in some embodiments pass dc messages to dc devices that are authenticated with the router. A dc message may be checked authenticated online through the router; Such a router may not route non dc messages; a graphics card and GPU supporting dc devices for displaying dc devices without passing through the dc domain and so forth.

Figure 15:
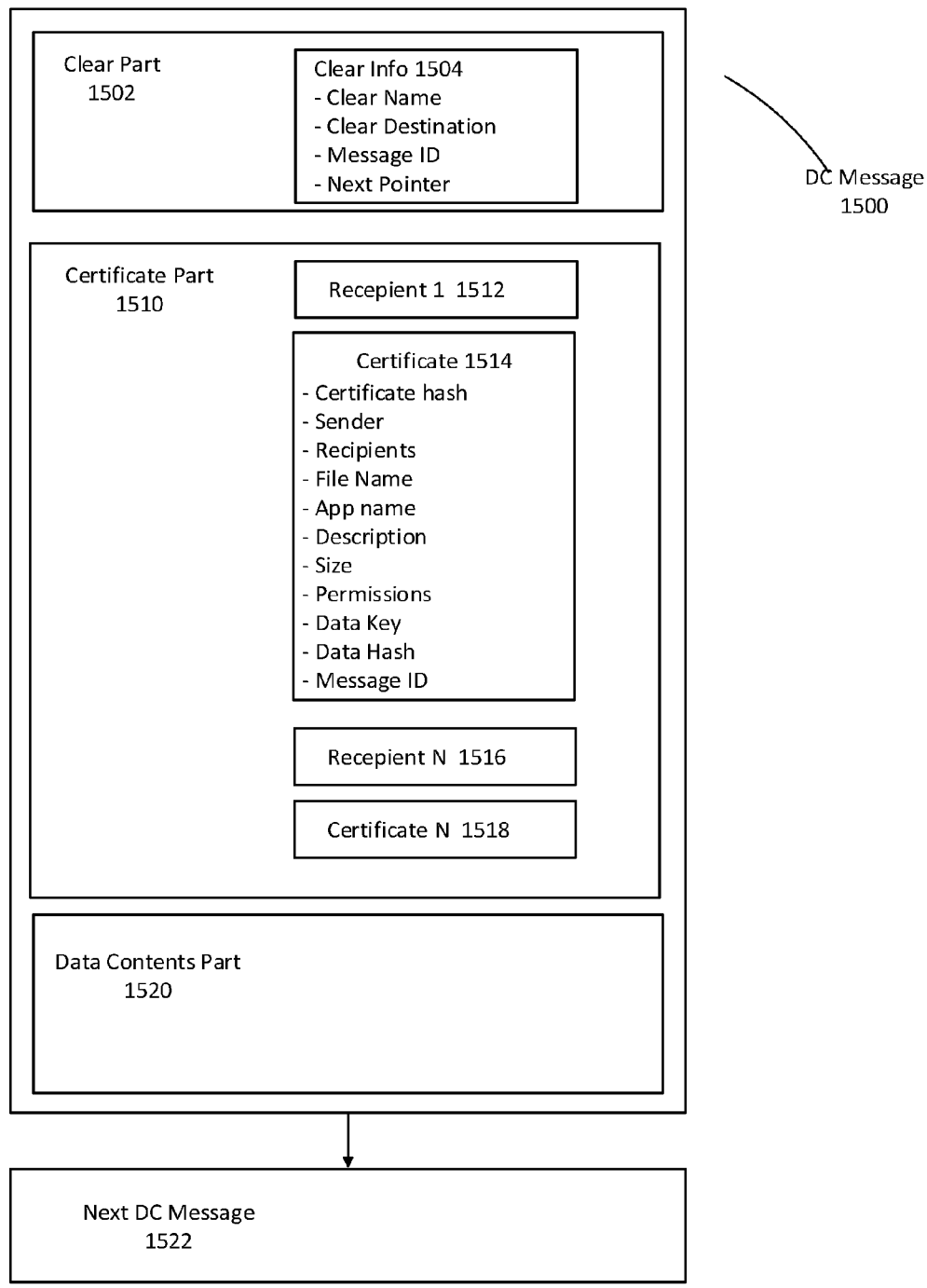
FIG. 15 is a block diagram illustration of a dc message, in accordance with an embodiment of the present invention.

Reference is now made to FIG. 15, which is a block diagram illustration of a dc message, in accordance with an embodiment of the present invention comprising clear part 1502, certificate part 1510 and data contents part 1520. The clear part 1502 comprises clear info 1504. The clear part 1502 contains data that is not encrypted and can be read in the ac domain. The clear info 1504 includes clear name, clear destination, message ID and Next Pointer. The clear name which is a name such as a filename or document name in the ac domain (which may be different to the name in the dc universe) which this document can be referred to in the ac domain. The clear destination is a destination for this dc message. Such examples of destination may be a URL in the ac domain, for pointing to a remote site or a local filename, an attachment name etc. The next pointer is a pointer to a next dc message if any. This offers the ability to send several dc messages together carrying different data intended for different endpoints. A message ID is an ID for this message so that messages cannot be replayed. This message ID as well as the other fields in the clear part 1502 may be repeated in the certificate part or be hashed in the certificate part so that it may be verified that they have not been changed.

The certificate part 1510 within dc message 1500 contains a certificate for each destination/group/user. For each destination there is a recipient 1 1512 and certificate 1 1514 for destination 1 . . . recipient N 1516 and certificate N 1518 for destination N, in order to make available a certificate for each destination. Each certificate is intended for a specific destination and only that destination is capable of decrypting it using its key. A destination may be for example a user dc device, a group of dc devices, a server dc device etc.

A certificate includes a certificate hash for checking correctness of the certificate post decryption; the sender; the recipients of the message; the file name which can be a secret file name and different to the clear name 1504; app name is the application that this file belongs to (such as a word processing file for a doc file); description is a description of the file; size is the size of the file; permissions are the permissions such as read, modify, copy, copy text etc as well as the ability to forward to someone else or to not be able to send it onwards. Data key is the secret key to decrypt the data contents part 1520; the data hash is the hash to check the data is intact following decryption. The message ID is the ID of the message which may be a repetition of the clear part. This may be needed in order to know if a message has been out of order, missing or replayed.

A dc message is intended to allow communication in the dc domain between different nodes or outside a node such as for storage. A dc message enables to fully control the data to full extent including file ownership; to control the ability to modify, copy-paste, send onwards data etc. In some embodiments where a file can be transferred to the ac domain, all those owning the file must agree to this step in order for it to be accomplished. In some embodiments when this is done the original file is deleted from all those using the file in the dc domain. In some embodiments it is possible to unsend a document or an email. So that for example if a user changes her mind she can send a request to unsend a document. In some embodiments a document may exist for a limited time only on a certain persons device. Following that time the document or file becomes useless.

A dc message may include several dc messages together that may be placed into different stations along a path between several servers where different dc messages may be used with different servers according to each dc message part permission.

If we go back to FIG. 2A now, a dc message being transferred from the dc domain in layer 3 which is forming the dc message in the open, transferring it to layer 2 to be secured and then out to layer 1 as a secured dc message with a destination for storage or communication. And the other way around when a secured dc message arrives to layer 1 as its destination where the dc message is moved into layer 2 where it is authenticated, checked and opened into layer 3 with the appropriate application and version using the data in the dc message and used according to its intended use. This can be seen in FIG. 2B. Intended use can be for example, view only, edit, not shareable, shareable, private etc.

In this way using FIGS. 2A and 2B and FIG. 15, it becomes possible to carry out dc application execution on dc data in the dc domain where the dc universe encompasses devices connected through the ac network. Furthermore with the initial applications mentioned above, it becomes possible for a user to make use of the dc data and to make use of dc applications that use the dc data in the dc domain.

In a preferred embodiment Layer 2 in FIGS. 2A and 2B is a hardware secure device as is mentioned by the initial applications or some other hardware piece that offer physical separation with a secure data core. In other embodiments it may be two separate machines or two internally switched devices that operate similarly. For example, a mobile device with two computing cores that may be switched between one another, where one is connected to the other through a layer 2 disconnection device and the cores can both be connected to the mobile device screen, either entirely or partially combining some of each as is mentioned in the initial applications.

As a result of using the 3 layers and dc messages, the dc device in the dc domain of layer 3 can now use the network through a device connected to the network but still retain in the dc domain.

Layer 3 devices which are in the dc universe communicate using dc messages. Dc messages may travel over any network or medium such as TCP, UDP, raw IP, etc. and over wifi, NFC, blootooth Ethernet etc. As opposed to TCP, in dc messages the source is verified, the destination is verified, contents is verified and the entire communication may only be used by the verified intended recipients of the dc message.

FIG. 15 displays a dc message that may be sent between dc devices. In some embodiment it may be that the only communication allowed to enter a device such as a router or a machine in general, is a dc message. The reason is that a dc message is a controlled communication message which has a verifiable source and destination entities as well as a source and destination application and application instance. The dc message may be reviewed by the ac/dc adapter and checked whether it is valid and matches the application and instance running. This is in contrast to IP address, protocol and port which are not verifiable, may be spoofed and may be sent to any application and application instance. In some embodiment a dc message may have another layer or part to allow parties not of source and destination to authenticate a valid dc message. This way dc messages that are not valid may be dropped along the way.

We will now review some aspects of the present disclosure.

The initial applications as well as the provisional application for the present disclosure use the term parallel universe or parallel world referred to as dc domain or dc universe. The current universe or current world is referred to here as the ac domain or ac universe.

The reason for that term change is that in the present application, the dc terminology more closely resembles a computing island rather that a parallel universe term, because the dc device is isolated not only from the ac domain but from other dc application instances that occurred previously on the present device. The dc device is separate from other dc devices that no communications is now occurring with. The dc device may be separated from other dc cores on the same machine if any, when no communication takes place between them.

The removal of surface area that is one of the goals of the present disclosure is taking place by removing attack surface from a currently executing dc instance from ac domain as well as from any other dc instance on the same device. The dc instance is also isolated from other dc devices not currently communicating with it.

The removal of attack surface from a dc device is as follows: a) separating the dc device from ac; b) isolating dc instance from other dc instances occurring on the dc device. When connecting two dc devices in communication, they are both separated from ac. Isolating dc instance from other dc instances on the dc device as well as isolating dc instance of second dc device from other dc instances on the second dc device. Therefore the dc device is not isolated from the current instance on the dc device as well as not isolated from the current instance on the second dc device. Since both instances on the dc devices are separated from the other instances on those devices, the dc device maintains separation in the dc domain.

The separation of the dc device from ac may take place by the ac/dc adapter that may be paired with a dc server so that communication is taking place bypassing the ac domain. The dc terminal for separating dc device from ac is another aspect of the separation, having for example, display and user input not going through ac is another aspect of this separation.

The dc application may also be affected by opening a previously stored dc data file for example. In this case, suppose a malware finds its way to such a device. In such case the malware is confined within the dc island and may not communicate outside due to the nature of the dc device. Furthermore, any changes made in the dc device may be lost once the application ends and the ac/dc adapter resets and reboots the dc device from an authenticated image by the ac/dc adapter. In this way, the malware is contained within the file or communication and cannot spread out.

To explain an embodiment for such a setup, consider the ac/dc adapter being implemented by an Analog Devices Blackfin chip, the BF707. The BF707 has the ability to only execute programs that are signed with a private key that matches a public key burned into a specific memory location on the chip with one time programmable memory. The executing signed program then has access to the AES symmetric key used for encrypting dc data coming out of the dc device and decrypting data coming from the ac domain. In this way the initial setup of the removal of attack surface from the dc device begins. The Blackfin chip allows to separate the dc device from the ac device using the AES key thereby isolating the dc device from the ac domain. The Blackfin chip is furthermore responsible for the dc device application isolation. This is done by having the dc device run from a RAM disk and load its image through the Blackfin chip which has the ability to authenticate it, for example by receiving it encrypted with the AES chip and checking its signature post decryption. The Blackfin chip further may control the resetting and power of the dc device. The Blackfin chip resets the dc device every time an application completes and the dc device reloads the authenticated image from the Blackfin chip. This way the dc application executing in the dc device is isolated from other dc instances. The meaning of removing of attack surface from the dc device means the separation from the ac domain and the separation from other dc instances. Therefore the dc device executing the dc instance has no attack surface from the ac domain.

The ac/dc adapter may receive commands from the ac domain for the dc domain. The ac/dc adapter isolates any such commands from the dc device so that the dc device is commanded through the ac/dc adapter in an isolated manner to keep the separation as described above. To carry out an implementation, the ac/dc adapter implemented for example by the Blackfin chip as described above, runs a small program with no operating system. The Blackfin chip has built in crypto library and therefore the small program only implements specifics relating the ac/dc separation and dc instance isolation. The ac/dc adapter may allow certain commands from ac to the ac/dc adapter keeping the isolation as above. It is important to have the code in the Blackfin chip written carefully. The entire program is located in RAM of the Blackfin chip in order to protect the memory, for simple implementation and since the program is small. Since attack surface may exist by the ac domain to the Blackfin chip as the ac.dc adapter, it is clear why it is of great importance that the Blackfin chip only execute signed programs and that the program is small and easy to review. If this program is written properly then removal of attack surface from ac domain is possible for the dc device.

The ac/dc adapter with its execution of only signed programs is a starting point for a building the removal of surface attack. It may be seen as a place to stand on. Archimedes is known to have said, "Give me a place to stand, and I will move the earth". Learning from that saying, the motivation for a standing place is clear in a place where everything you do is an attack surface. The ac/dc adapter becomes the standing place for the removal of network attack surface. That is because the ac/dc adapter is the place where you know your code initially executes unmodified and enclaved. For example, a SoC that may be used for the ac/dc adapter may be isolated as explained in the initial applications. The ac/dc adapter executes only signed programs authenticated by its burned public key. The signed program running in the ac/dc adapter has access to the ac/dc adapter key. In some embodiments the same key exists in the dc server from manufacturing time. It is preferable that the dc server holds the key of the dc device in a device that runs only signed programs.

The ac/dc device encrypts any file coming from the dc device to the ac device with its key. The ac/dc device decrypts files coming from ac to the dc device. Only such data may enter the dc device. The ac/dc adapter key does not leave the ac/dc adapter on a communication channel but is used within the ac/dc adapter. This lets encrypted dc files in ac domain be without surface attack because the key is not accessible in ac. The encrypted dc file may be usable in the dc server where a copy of the ac/dc adapter key is kept.

The dc device is connected to ac through the ac/dc adapter only. It has only RAM memory and is booted through the ac/dc adapter to an image that is verified by the ac/dc adapter, which is a place where we can stand due to the signed program only execution of programs. Furthermore the ac/dc adapter may reset and in some embodiments shut power to the dc device as well as wipe its memory to reboot to the verified dc image. This may take place in a preferred embodiment, every time an application execution instance ends. Therefore the dc device is separated not only from the ac world, using the ad/dc adapter key, but from other dc executing instances in the dc device. In some embodiments, if a dc data file is sent in encrypted form through ac to the dc server, the dc server instance is also separated in much the same way, from other dc server instances as well as from the ac domain. This makes up the removal of surface attack. The ability to separate data in dc from the ac domain and from any other dc instance, making the executing dc application isolated like an island.

Adding a dc terminal to the dc device enables the user to view data, read control and modify data using their I/O devices while retaining the removal of surface attack.

The removal of surface attack as explained above separates a dc instance in such a way that even if an adversary did manage to get a malware inside my dc device, then this malware would neither be able to communicate to ac nor make any change that affect other dc instances. Therefore the malware is contained in its file.

Sharing a key between two devices upon manufacturing or in some embodiments, in a physical isolated controlled location, enables to bypass the ac domain by the dc devices. There is no protocol where the key is traveling and the devices keep the key out of reach of the ac domain by allowing only signed programs to run on the device. In some embodiments, this key is not used directly but used for an initial key exchange for a session between the two devices.

In an embodiment for a PC or laptop or other device, a device may connect between a device and a display through a USB type C connection implementing thunderbolt 3. The connection outputs the PC display to a separator device that combined the dc output with the PC output and outputs the combined image to the display. The separator device has an ac/dc adapter and a dc device inside. The ac/dc adapter connects through the USB-C connection to the PC with a USB-like connection. Mouse and keyboards may connect to the separator device, or alternatively, a Bluetooth for keyboard and mouse may be implemented within the separator device. The separator device sends keyboard and mouse events to the PC through the USB-C connection with a USB-like connection. This way, using few connections the separator device may be connected.

Please note that touch screen events may travel similarly to the separator device and the separator device pass them as needed to the PC in the ac domain. The example of a PC may be used for other devices with other I/O as follows.

The ac domain may include devices connected to the internet or network such as PCs, laptops, tablets, smartphones, internet of things, servers or other connected devices.

The server dc framework as mentioned in FIG. 1 and other figures, is a framework that may represent one or more devices such as computers, database servers, large storage etc., which may be connected in various ways to other devices in the dc domain. In some embodiments connections to other devices in the dc domain may take place through the network as well, either in a network that is only within the dc domain or through the layers as described in FIG. 2. In one embodiment machines may be networked within the dc domain and accessible to the ac domain through dc devices. In essence the dc server framework may stand for a framework of devices put together for achieving certain functions such as for serving contents, serving ads, supporting online document editing for one or for multiple users, offering mail services, offering payment services, offering anonymizers for content serving, for serving information or for securely controlling IoT and for securely communicating with vehicles as described in the figures or can serve other functions as may be available on the Internet. These examples display how common services on the Internet may be implemented in the dc universe or dc domain while offering secure communication and anonymity. Similarly, other services on the Internet may be implemented in the dc universe.

The exclusive property of the dc universe, allowing only devices in the dc universe to communicate together and allowing the actual communication parties to be controlled, is the base of establishing a secure universe where a user can have a starting point of operating with some security over the no real security available today for network connected devices.

The server framework may be used to protect databases, protect the data included in the database as well as transactions taking place. Having the database and relevant servers communicate in the dc universe using secure authenticated devices has clear security advantages over a ac environment.

Uses for a system such as a dc device and a dc server may be as follows. Two dc devices may meet at a dc server in order to communicate in the dc domains. The dc devices may not know each other. For example, each dc device may have a public device ID to be sent in ac domain. The dc server passes messages between devices according to their IDs since it has the keys for any device ID. The dc server decrypts the message from device ID 1 and encrypts for device 2. Another example is using a random key by both devices in ac. Each device sends to the dc server a request with the random number. The dc server able to communicate with each device matches the two devices turning with the same random number. Another example is using email address of two users when one sends another an email message. The dc server may have email address info for each user using a dc device.

A payment may take place using the dc domain as follows. A dc device and a payment device may come to close contact for making a payment, such as using |NFC. The dc server knowing both devices makes a communication in dc. The user receives an authorization request on the dc terminal to authorize the payment. Payment players such as payment processor, payment gateway, bank and Visa have a dc server for completing dc payment from device A to device B in the dc domain. In some embodiments the dc server may keep user credit card numbers in dc so that no need to insert credit card each time. In some embodiments only 4 last digits are kept on the dc server and with Visa or such the card is matched and fetched for the user. In some embodiments the dc device receives as input an email address or a user device ID, and in some cases this takes place in the ac domain.

Additional uses for the dc domain includes IoT, Vehicle, user authentication, cloud applications, business applications, financial applications, chat, email, social networks as well as web surfing;

In order to accommodate law enforcement lawful requests by abiding to a court order for a limited time, it is possible to create a temporary key in the communication between the dc server and the ac/dc adapter to be used between certain dates and times and once that time is over, revert back to the previously used key. If the temporary key is then given to the authorities they can monitor the user for that requested time only.

A dc server used in the disclosure may in some embodiments be made up of multiple servers isolated from each other using dc devices. Each dc device or core working with a single dc device instance at a time. This means that even if one somehow is compromised, as someone may break their dc device physically, this will not affect other dc devices and dc servers. The removal of surface attack means removal from ac as well as from other dc instances on dc device and from other instances on the specific server dc device used for communicating with the dc device.

A dc server used also for meeting between dc devices may hold multiple keys for multiple devices for converting a message from one machine to another machine. A dc server may be placed in a CDN close to the user so that communication in dc is close to the user and in some embodiments random dummy dc messages are sent to hide when a user actually uses the dc device.

The dc picture image is explained in the initial applications. It is used to authenticate to the user the current application or window displayed is in dc. This is done using something the user recognizes that exists in dc domain, such as an image. If the same dc image is displayed with every server in dc domain, this may cause a mix-up so in one embodiment different images may be used with different parties. In another embodiment, to make sure the user knows which party the communication takes place with, in the dc domain, as part of the authenticating image a message on it is displayed saying that the dc session is with a specific person or body such as a company. In some embodiments in addition to the image or instead of the image there may be other ways to signal to the user the dc device is processing data such as a separate display, lights, music etc. The authentication process can be a continuous one or a repeating one, rather than be presented only at a certain time. In this manner the dc domain authenticates to the user and identifies who is or what is the communication that takes place with, to the user.

Additional input devices into the dc device, such as a fingerprint reader may allow additional confidence in the communication. While the dc domain allows confidence between devices, if a device is used by more than one person or if a device is lost and found by someone else, there is a need to tell a specific user is authorizing a transaction such as payment or is reading or writing a message for example. A fingerprint reader allows to identify a user and a device to the dc server allowing for applications with a confidence of device and user, for example, changing authentication image. A payment may ba authorized this way, authentication may be made such as pairing an existing user with another dc device and so forth.

Similarly additional input and output devices may be added to the dc device for input of data into the dc domain or for viewing or receiving data from the dc domain, such as audio data, visual data, digital data, other sensing data etc.

When a dc device communicates with no network attack surface with a dc server, some processing may take place at the dc server and then data is sent back to the dc device, in some embodiments the dc server may compose of one or more servers. In some embodiments the communication to handle the dc device requests or messages may not all take place in the dc domain.

A dc application executing within a dc device is executing with no network attack surface. This application may communicate with the dc server as mentioned in the previous paragraph so that the dc server serves the dc application.

No network attack surface means that the no attacker in the network and in the devices attached to the network has attack surface to attack the dc communication between the dc device and dc server or the dc application within the dc device. What is meant by that is among other things, the inability of getting hold of open clear, unencrypted data, or hacking into the dc device in a way that affects other dc instances. In some embodiments this does not include physical access to the device or being able to directly break encrypted data such as breaking an encrypted AES 256 bit key message with a key or any other helping means. That is because the key encrypting the data is not communicated and is kept within a signed only executing environment. The concern of this disclosure is with data over the network rather than the attacker having physical access. This does not mean physical access may not be blocked to the device physically, for example with a fingerprint reader or password. The removal of network attack surface means that a user or device over the network will be able to go as far as getting hold of encrypted data coming out of the ac/dc adapter. This is achieved in a preferred embodiment by 1) having the communication taking place by a paired hardware device with an identical key that in some embodiments does not travel through any protocol out of the hardware device and 2). By resetting the dc device and possibly the dc server or portion of it, following the end of application or transaction.

The dc server may operate similarly or differently to the ac/dc adapter and dc device in order to remove attack surface from the internet. In one embodiment where the dc server allows the communication between two dc devices through the dc server to take place, the dc server may convert the message from one dc device to another dc device using device keys, without actually running an application that reads the data, therefore in this case only the communicating dc devices instances may be exposed to message, which then vanishes when the devices finish using the message. In other embodiments a dc server holds an encrypted message for a user and does not actually open it or use it. In another embodiment the dc server receives a message from a dc device intended for the dc server to process or for another connected server. The connected server may implement a transaction-like operation for reading the message, operating one of allowed actions from a list of allowed actions and then resets to handle another request in clean memory from the previous dc device message. The idea is that it is possible to not pass infection and malwares on to other instances and devices but if any exist the y should remain contained also in the dc server side as well as in the dc device side. Containment is one of the factors for the removal of surface attack from the network and generally from the internet.

The removal of attack surface from the network and network connected devices, while allowing the user to use their networked connected device to communicate with another user or with the server through the network with no network attack surface, which is one of the objectives of the present disclosure, is brought together by several factors. 1) A dc device that is separated from the network; 2) an ac/dc adapter connecting the user ac device connected to the network and the dc device in a way that allows the dc device to communicate through the network with a dc server with no network attack surface. This may be achieved by the ac/dc adapter having a key paired with the dc server and a way to reset the dc device whenever an application completes. 4) a dc terminal for the user to interact with the dc device through I/O that does not pass through the ac device or the network in unprotected, unencrypted form. The dc device may be usable through the ac device I/O means. 5) a dc server that is paired with the ac/dc adapter and receives requests from the user to communicate with other user dc devices or for serving services on the server to the user, all with no internet attack surface. The dc server achieves this in the manner described above, for example, in the case where the server may only pass messages through, may pass messages by changing their encryption key between devices, or reset a particular device following messages prone to malware may be opened in a dc device on the dc server, so that containment is possible with potential malware in the dc server.

Having these factors allow the user to use their ac device that is connected to the internet and use applications in a way that have no internet attack surface from the user interaction to the server receiving the data.

The dc terminal may be implemented in different ways. An example was given in FIG. 1D and FIG. 13 and other ways may be implemented such as using framebuffers in remote desktop application where ac display travels to a device and dc display also travels as framebuffers to the device. The point is that the display as well as user input does not pass through the ac domain. In some embodiments a dc terminal may also be using audio.

In some embodiments a social networking site may use the dc domain for closed group communication. A user in the social network may allow friends only through dc domain or allow different types of friendships in dc domain and ac domain. This way social networks may be more secure for the users. In such a case ads may be delivered to the users in the dc domain. Private messages may also be implemented using the dc domain. In some embodiments friends in a social network may have a separate key for their communication. This key may be used for their own communication as well as forming other communications groups with other people.

In some embodiments there may be an API made to allow $3^{rd}$ party developers to insert dc support to their applications, such as dc attachments, dc messages, dc forms etc. In some embodiments a friend can join friends using his key.

In some embodiments, the dc device may be limited and not allow to send it command line arguments to programs or code.

The three layers presented in FIGS. 2A and 2B are for illustration purposes. There may be more layers for example or there may be less layers such as 2 layers: 1 segmenting unit and 2 the dc device.

A disconnection unit as the ac/dc adapter may separate data from the ac domain devices for portions of an application or for an entire application. An email example follows. In the first example emailing someone using ac domain webmail on HTTP/S and adding to the message a secure attachment in the dc domain that is composed with the user dc device using the user normal screen or terminal. To the user the attachment is seemingly as part of the webmail. In the second example, the entire webmail service is in the dc domain. The second case seems much better for achieving privacy, preventing spam, preventing phishing, for authenticated senders etc, as the entire email is secured in the dc domain. On the other hand the first case can work on existing webpages and applications today. This also means that the presence of the secret contents is detectable as well as the information regarding the fact that this email between these people has just been sent.

Once we use an attachment as a means of implementing dc communication, there can be an API developed to allow $3^{rd}$ party developers to insert a secure dc attachment into their application. The dc domain becomes a part of the application in the ac domain and when a dc portion is used the screen or part of it and keyboard/typing/touch screen, it become that of the dc domain. And while the application itself which is in the ac domain is susceptible to attacks, the dc part is unreachable by the user applications, data, key loggers, display snapshots or any other ac domain part.

By using applications in the dc domain we gain the advantages of such a system that prevents phishing, spam, malware, APT, eliminates the password as well as implementing new ways to securely offer contents. The system offers privacy and anonymity to Internet users and makes the Internet a place where fraud is not possible by people you do not know and have no prior contact with. The Internet is becoming the backbone of knowledge and communication of the human race. Making this backbone safe and secure is a primary goal in keeping the Internet usable and safe for all of us.

Having the Internet inherently flawed by security and having this network connected directly to our operating systems gives an attacker many avenues of attack. On top of that there are the unauthenticated email senders that can send phishing baits, sites that we misspell and get diverted to unknowingly, websites that have been hacked and so on. The only way to deal with such a multitude of avenues of attacks is to complete isolation. This actually means the Internet infrastructure is used as it is and the dc domain operates over it. The transition to using the dc domain is made easy this way as follows: existing internet applications still work as they are with an additional dc attachments and API in place to add functionality, while other services may be built entirely for the dc domain.

The present disclosure enables new services and opens up new markets with the ability to operate in secured environments that work on top of the ac domain and that may be used from the ac domain. Such services include securing email messages, authenticated email recipients and senders, the end of spam mail, the end of passwords, secured social networks, secured chats, online confidential monetary transactions, anonymity, web pages in dc, serving secure ads, purchasing in the dc domain, delivering secure digital contents purchased in the dc domain, securing document editing and sharing, and with an API it is possible to expand other ac applications to include a portion within the dc domain.

The use of the dc domain may be: 1. Within a page or application for example, an attachment, for entering credentials, for authentication through the dc domain, while the rest of the application is in the ac domain; 2. Entire web page or application within the dc domain such as document editing online for one user or more, an email client or webmail;

In some embodiments a request as an HTTP/HTTPS request may take place in the dc domain and the reply in the ac domain. This may include cookies and cookies transfer etc. This may be an intermediate stage so for example searching request may be in the dc domain and the reply in https in the ac domain. In another embodiment the search is carried out in the dc domains so in FIG. 1 server framework 116 stands for the search servers.

In mobile environments applications such as text, SMS, chat, Watsapp, location applications, navigation applications, other apps as well as voice conversations and voice commands may take place in the dc domain.

In addition to separation and isolation of the dc domain, the fact that in some embodiments one cannot simply write code and place it to execute in the dc domain or even enter arbitrary input to an application is an aspect of maintaining of the dc domain. In the ac domain a user may be tricked into installing a malware. In the ac domain malicious input to an existing app may offer an attacker ways to gain control of a system. The dc domain on the other hand, in some embodiments does not enable the user or even trust the user to do such things. Just like computing languages which are managed code do not allow memory allocation, so is the dc domain a managed domain where the user may execute her installed applications but will not be allowed to install unsigned applications for that user specific device. Essentially only contents may be modified by the user, rather than technical data fields and system commands. Actual installation of new or updated applications takes place in some embodiments, through authenticated providers in the dc domain for example, using dc messages received by authenticated trusted contacts.

For example, in some embodiments, in the ac domain one may open an email client in some network and compose an email with any originator email address such as from god@in.the.sky or Robert.smith@thecure.com. In the dc domain, in a preferred embodiment the user has no control over the "from" field. The user may choose between recipients which are already known to this user in the dc domain and secure communication may take place using, for example, the symmetric key that exists for a communication with each user or entity in the dc domain. In some embodiments only the contents and the subject may be freely entered.

The serving of contents and ads in the dc domain, as displayed for example in FIG. 5, may allow a user to purchase items within the dc domain for example through the presentation of secure ads, using secure payment as in FIG. 8. This means that the user may complete the entire content to ad to purchase all securely within the dc domaine. So for example if I am a business man that wants to meet a prospective client in another country and I don't want my competitors who employ cyber espionage to know which country I'm flying to, which hotel I will be staying at and and on what dates I will be there, I can book and pay directly on the dc domain. If I receive an email from the prospective client and the ad server presents flights and hotel at good prices then I can get all these directly in the dc domain and protect my entire business. This is also showing the importance of not mixing dc ads and ac ads.

To summarize some of the applications and the way to implement them within the dc domain, lets look at the following: dc domain as an attachment—a word document shared between two or more users; email secure attachments where wrong recipients cannot read the encrypted contents; entering a password or rather instead of a password; credit card usage where a person can communicate with a server and merchant where clearing can all take place in the dc domain; Allowing people to meeting in the dc domain so they can authenticate each other and then continue to communicate directly; secure contents within an app such as chat in a social network; adding an API for transmitting secure dc data between users and presenting it to them; 2. Dc domain as the entire application—google docs like application in the dc domain where the changes are aggregated and sent in an offline-like manner; webmail entirely behind the dc domain; anonymizing web browsing through a 3rd party host to browse through; similarly, anonymizing emails by sending emails securely through a $3^{rd}$ party that has the ability to open a portion of the messages to see and in some embodiments authenticate the real recipients and send the message onwards to them; contents serving in the dc domain; ad serving in the dc domain; payment processing in the dc domain.

Essentially entire functionality of the Internet may take place within the dc domain: user, server for secure content, content, ad, purchase, payment, content purchased, content purchased usage. Every action may take place within the dc device as well as within other users or other entities dc devices for sharing securely with other users or entities.

Some more examples may be presented, for example a social network where posting and commenting may be secure with a dc device. This could allow specific audience such as friends only, to view messages or comments etc. In this manner the dc domain may be used to augment security into common Internet services.

The separation between ac and dc domains appears in many ways, for example, the dc domain may be disconnected from the IP network, no input parameters, no user requested code execution. The separation and isolation within the dc domain may be most useful with the user being able to see and control both domains as explained in the initial applications. The totem or authenticating image, video or sound may let the user distinguish between the universes.

Some more dc examples may be banking, pay TV, Content protection, mobile financial services, mobile payments, authentication, enterprise and government for secure handling of confidential data throughout its life with permissions to read/modify/send onwards/erase all copies There may be several different ways in which to implement layer 2 separation such as that which is explained in the initial applications. Several secure technologies exist such as Arm TrustZone and TEE which is trusted execution environment software etc. In a preferred embodiments a layer 2 is implemented by a hardware and software solution that only separates layer 1 hardware from layer 3 hardware so that layer 2 role becomes very specific and small. In one embodiment the only role of layer 2 is to take in an encrypted dc message from layer 1 and output an open dc message to layer 3 and vice versa. The encryption is done with a key only available in layer 2 and protected by the hardware of layer 2. The communication between two devices is explained in FIG. 12. In another embodiment, the reseting of the dc device takes place following execution of applications.

The layering mentioned in FIGS. 2A and 2B may be viewed as layers over the OSI layers such that ac domain makes up layers 1 through layer7, dc messages travel over these layers, the segmentor or ac/dc adapter is layer 8 and layer 9 is the dc domain. There are other additional ways of viewing these layers.

The secure server framework as discussed in FIG. 7 is made of the secure web mail server for serving mail to a user. In some embodiments it is a server mail with ads. This framework of mail and ads is simplified to present the ability of serving secure mail contents originating in the dc domain securely to a user through the user ac machine. In some embodiments mail such as here is being served not by web but other ways such as mail client.

This framework of content and ads is simplified to present the ability of serving contents and of serving ads originating in the dc domain securely to a user through the user ac device.

This invention lets the user use internet apps on their device with no internet attack surface. In this disclosure it is shown how to completely remove attack surface from the internet for devices that connect to the internet. This allows communicating over the internet with completely no internet attack surface using the user internet connected devices. The complete removal of attack surface is made possible through the unique dc domain as explained in this disclosure.

The solution described is seamless to the user with the addition of the solution authenticates itself to the user to let the user know the accessed data is indeed secure in the dc domain. This is necessary when using the same display that applications that have attack surface form the network also use.

This solution can protect secure data even if an intrusion has already occurred, and protect the data even from an inside security data breach.

In some embodiments a single device may include several of the devices described, such as a dc device and an ac/dc adapter. In some embodiments a form factor may be made that includes several devices such as a dc device, an ac/dc adapter and an ac device for using connecting to the network and passing messages to the dc device. In some embodiments a form factor may be made for an ac device to be inserted inside the ac device to offer using the network with no network attack surface.

The term network and internet are used interchangeably in this disclosure. The term network may be viewed as more general to include the internet.

CONCLUSION, RAMIFICATIONS AND SCOPE

Accordingly, the reader will see that the disclosure of this invention provides a system and method that lets the user use internet apps on their device with no internet attack surface. In this disclosure it is shown how to completely remove attack surface from the internet for devices that connect to the internet.

The solution described is seamless to the user with the addition of the solution authenticates itself to the user to let the user know the accessed data is indeed secure in the dc domain. This is necessary when using the same display that applications that have attack surface form the network also use.

Therefore composing, editing and reading of secure data can be made with reassurance.

The usage of secure, protected data is transparent to the user and secure, protected data can be shared and safely sent to other users.

This solution can protect secure data even if an intrusion has already occurred, and protect the data even from an inside security data breach.

This solution protects various types of sensitive data such as documents, emails, code, images, videos; sensitive data entry such as credentials to a website; editing documents, composing emails; writing code; remote data usage etc.

The solution supports a server network in the dc domain to securely operate a framework in a remote location for another dc device. The dc device network may serve to name a few, contents, ads, emails, web pages, multi user document editing and reading, providing contents anonymously, secure payments, secure IoT, secure SMAC as well as many services over the Internet. The solution may allow to get rid of passwords by authenticating the dc device to the server and in some embodiments also the user, prevent spam, phishing scams, malware etc.

Although the description above contains many specifications, these should not be constructed as limiting the scope of the invention but as merely providing illustrations of some exemplary embodiments of this invention.

For example, other means of hardware protection mechanisms may be used to implement this disclosure apart from the Analog Devices securing technology. Hardware protection may be used for computers, laptops, mobile phones, tablets, IoT, servers rtc. A single device may implement several of the devices mentioned; Communication between secure devices may be made with ways other than dc messages. The 3 layer model in FIGS. 2A and 2B may be displayed differently. Other ways of initializing the device may exist other than pairing the device on manufacturing.

While certain features of the invention have been illustrated and described herein, many modifications, substitutions, changes, and equivalents may now occur to those of ordinary skill in the art. It is, therefore, to be understood that the appended claims are intended to cover all such modifications and changes as fall within the true spirit of the invention.

It is expected that during the life of this patent many relevant devices and systems for removing network attack surface will be developed and the scope of the terms herein, particularly of the terms "ac device", "dc device", "dc domain", "ac domain", "ac/dc adapter", "dc server", "dc framework", "ads", "IoT", and "smart vehicles" are intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A system for removing attack surface between data isolated devices that share their input output means comprising:

User device configured to connect to a network and interact with a user through shared input output means wherein said input output means comprising at least a user display and a user input means;

Secure device coupled to said user device for processing data and interacting with said user at least partly using said shared input output means wherein said secure device is configured to prevent any data communication and data access from said user device and wherein data from said shared input output means is at least partially inaccessible to said user device when used by said secure device;

Remote secure device for communicating with said secure device over the network said secure device configured to use said user device network connection at least partly for communicating with said remote secure device wherein at least part of said remote secure device communication data with said secure device is not accessible to said user device whereby said secure device interacts with said user using said shared input output means and communicates data based on said interaction with said remote device with no attack surface from said coupled user device.

2. The system of claim 1 wherein said secure device authenticates itself to said user using said shared input output means when said secure device is in use on said user display whereby said user differentiates between use of said secure device from use of said user device on said user display.

3. The system of claim 1 further comprising an Internet of Things hereafter IoT device said IoT device is connected to said secure device whereby said IoT device is used over the network by said remote secure device to remotely control said IoT device with no network attack surface from said user device.

4. The system of claim 3 wherein said IoT device is configured to communicate directly with another one or more IoT devices over the network wherein each said one or more IoT devices connect to a secure device thereby said IoT devices communicate with no attack surface from said user device.

5. The system of claim 4 wherein said user display is used by said secure device for said user to control one or more said IoT devices through said remote secure device over the network with no network attack surface from said user device.

6. The system of claim 1 further comprising a vehicle part device connected to said secure device whereby vehicle part device communicates over the network with said remote secure device with no network attack surface from said user device.

7. The system of claim 6 wherein said vehicle part device is configured to communicate directly with another one or more vehicle part device over the network with no network attack surface from said user device wherein each said one or more vehicle part devices connect to a secure device.

8. The system of claim 6 further comprising a user display connected to said vehicle part device for user to receive information from said remote secure device over the network with no network attack surface.

9. The system of claim 1 further comprising a content server configured for communicating with said remote secure device for delivering content to said secure device whereby said remote secure device has data about user of said secure device for delivering relevant content from said content server to said secure device over the network with no network attack surface.

10. The system of claim 9 further comprising a source of user data in addition to said remote secure device for matching content to user of said secure device wherein choosing of content from said content server to send to said secure device by said remote secure device is made using said source and said remote secure device to match content for said secure device.

11. The system of claim 1 wherein said secure device authenticates said secure device use to said remote secure device for authenticating user to a server on the network with no network attack surface.

12. The system of claim 11 further comprising user identifying capabilities for authenticating device and user to a server on the network with no network attack surface.

13. The system of claim 1 wherein user is prompt for authorizing payment on said display for making payment through said remote secure device over the network with no network attack surface.

14. The system of claim 1 for using cloud application on said display powered by said remote secure device over the network with no network attack surface.

15. The system of claim 1 for sending messages between two or more users through the network with no network attack surface.

16. The system of claim 1 wherein a remote user device connects to said user device over the network heretofore said secure device has no attack surface from said coupled user device thereby said secure device is not accessible by said remote user device whereby said secure device has no network attack surface from said remote user device.

17. The system of claim 1 wherein said secure device is not connected to a network and wherein network data for said secure device is received through a conversion device for blocking non secure data from said user device and from the network and for cyphering and deciphering secure data for said secure device whereby said secure device has no network attack surface from said user device.

18. The system of claim 1 wherein said user device and said secure device are contained within a single physical unit.

19. The system of claim 1 wherein data communication is exclusive between said secure device and said secure remote device and prevented from any other device.

20. The system of claim 1 wherein data communication is exclusive between a plurality of devices including said secure device and said secure remote device whereby data communication is prevented from devices not included in said plurality of devices.

21. The system of claim 1 wherein said secure device is physically not able to communicate data with said user device.

22. The system of claim 1 wherein said user is able to access non secure contents on said shared input output means with said user device and said shared input output means whereby said shared input output means are used for both secure and nonsecure content.

23. A method of removing attack surface between data isolated devices that share their input output means comprising:
   a. preventing data communication between a secure device and a coupled user device;
   b. sharing shared input output means between said secure device and said user device wherein data from said shared input output means is at least partially inaccessible to said user device when used by said secure device and wherein said shared input output means comprising at least a display and a user input means;
   c. communicating data from said secure device to a remote secure device over a network using data from said shared input output means inaccessible to said user device and prevented from access of said user device.

24. The method according to claim 23 wherein a remote user communicates with said secure device using a remote user device coupled to said remote secure device wherein said remote user device and said remote secure device share remote shared input output means wherein data from said remote shared input output means is at least partially inaccessible to said remote user device when used by said remote secure device and wherein said remote shared input output means comprising at least a display and a user input means whereby said remote user communicates with said secure device over the network with no attack surface from said remote user device and with no attack surface from said user device.

25. The method according to claim 24 wherein said display is used to authenticate said secure device to said user.

26. The method according to claim 23 wherein said secure device authenticates itself to said user using said shared input output means when said secure device is in use on said display whereby said user differentiates between use of said secure device from use of said user device on said user display.

27. The method according to claim 23 wherein said display is used by user to compose a message to be sent to said remote secure device with no network attack surface from said user device.

28. The method according to claim 27 wherein said display is used by said user to compose a message to be received by a remote user through said display of said remote device with no network attack surface from said remote user device and user device.

29. The method according to claim 27 wherein said display is used by said user to make payment to be received by said remote user over the network with no network attack surface from said user device and from said remote user device.

30. The method according to claim 27 wherein said display is used by said user to compose a document to be received by said remote user through said display of said remote device over the network with no network attack surface.

31. The method according to claim 23 wherein said display is used by said user to make payment through said remote secure device over the network with no network attack surface from said coupled user device.

32. The method according to claim 23 wherein said secure device is used by an Internet of Things device thereafter IoT device to send said remote secure device a notification over the network with no network attack surface.

33. The method according to claim 23 wherein said secure device is used by a vehicle part device to send said remote secure device a notification through the network with no network attack surface.

34. The method according to claim 23 wherein said display is used by said user to request content from said remote secure device through the network with no network attack surface.

35. The method according to claim 34 wherein said remote secure device processes said requested content and replies said requested content data to said secure device over the network with no network attack surface.

36. The method according to claim 23 wherein said display is used to authenticate said secure device to said user.

37. The method according to claim 23 wherein said secure device is used for authenticating said secure device to said remote secure device over the network with no network attack surface.

38. The method according to claim 23 wherein said display is used by said user to authenticate to said remote secure device over the network with no network attack surface.

39. The method according to claim 23 wherein said display is used by said user to handle a document with no attack surface from said user device.

40. The method according to claim 23 wherein said secure device sends file to said remote secure device for storage over the network with no network attack surface.

41. The method according to claim 23 wherein said display is used by said user for a cloud application through said remote secure device over the network with no network attack surface.

42. The method according to claim 23 wherein a remote user device connects to said user device over the network said secure device has no attack surface from said coupled user device whereby said secure device has no attack surface from said remote user device thereby said secure device has no network attack surface.

43. The method according to claim 23 wherein data communication between said secure device to said remote secure device is exclusive whereby no other device can communicate with either device.

44. The method according to claim 23 wherein data communication between said secure device to said remote secure device is exclusive between a plurality of devices including said secure device and said remote secure device whereby no other device can communicate with said plurality of devices.

45. The method according to claim 23 wherein communicating data from said user device to a remote device over a network using said shared input output means for using secure and unsecure contents on said shared input output means.

46. A system for using secure and non secure content using a single shared input output means comprising:
  user device configured to connect to a network and communicate with other one or more networked devices;
  secure device configured to prevent any data communication and data access from said user device wherein said secure device configured to use said user device network connection at least partly for communicating securely with another one or more secure devices wherein at least part of said secure communication is not accessible to said user device;
  said shared input output means for use of said user device and said secure device to interact with a user using the same said shared input output means wherein data from said shared input output means is at least partially inaccessible to said user device when used by said secure device and wherein said input output means comprising at least a user display and a user input means;
  whereby said user interacts with said user device to communicate user based interaction and said user securely interacts with said secure device to communicate secure user based interaction using a single said shared input output means wherein said secure interaction is at least partly inaccessible to said user device.

47. The system of claim 46 wherein said user uses said user device and said secure device at the same time wherein interaction of said user with said secure device is at least partly inaccessible to said user device.

48. The system of claim 46 wherein said secure device controls access to said shared input output means whereby said secure device chooses access rights to said shared input output means.

49. The system of claim 46 wherein said secure device informs said user when said shared input output means is used with said secure device.

50. The system of claim 46 wherein a remote device successfully gaining at least some control of said user device is prevented from accessing said secure device and at least part of said secure communication and said secure user interaction whereby said secure device and at least part of said secure interaction with said user has no attack surface from said user device.

* * * * *